United States Patent
Splichal

(10) Patent No.: US 11,061,859 B2
(45) Date of Patent: Jul. 13, 2021

(54) OBJECT CREATION FROM HIERARCHICAL METADATA STORED ON A STORAGE DEVICE

(71) Applicant: Red Hat, Inc., Raleigh, NC (US)

(72) Inventor: Petr Splichal, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 123 days.

(21) Appl. No.: 16/226,133

(22) Filed: Dec. 19, 2018

(65) Prior Publication Data

US 2020/0201815 A1    Jun. 25, 2020

(51) Int. Cl.
| | |
|---|---|
| G06F 16/14 | (2019.01) |
| G06F 16/908 | (2019.01) |
| G06F 16/13 | (2019.01) |
| G06F 16/901 | (2019.01) |

(52) U.S. Cl.
CPC .............. *G06F 16/14* (2019.01); *G06F 16/13* (2019.01); *G06F 16/908* (2019.01); *G06F 16/9027* (2019.01)

(58) Field of Classification Search
CPC ........ G06F 16/14; G06F 16/13; G06F 16/188; G06F 16/27; G06F 16/9027
USPC ................................................. 707/822, 825
See application file for complete search history.

(56) References Cited

U.S. PATENT DOCUMENTS

| | | | |
|---|---|---|---|
| 7,689,583 B2 | 3/2010 | Bozich et al. | |
| 8,572,136 B2 * | 10/2013 | Guarraci ................. | G06F 16/27 |
| | | | 707/825 |
| 8,745,585 B2 | 6/2014 | Watters et al. | |
| 9,043,305 B2 | 5/2015 | Osterman et al. | |
| 9,600,192 B2 | 3/2017 | Chambliss et al. | |

OTHER PUBLICATIONS

Wimmer, Raphael, "Files as Directories: Some Thoughts on Accessing Structured Data within Files," 2nd International Conference on the Art, Science, and Engineering of Programming, Apr. 9-12, 2018, Nice, France, ACM, 5 pages.
Author Unknown, "Using the Metadata Merge Utility," in Oracle® Hyperion Financial Management Administrator's Guide, Release 11.1.2.4.100, Oct. 2015, Oracle, pp. 121-122.

* cited by examiner

*Primary Examiner* — Shahid A Alam
(74) *Attorney, Agent, or Firm* — Withrow & Terranova, PLLC

(57) ABSTRACT

Object creation from hierarchical metadata stored on a storage device is disclosed. A request to generate an object from a hierarchy of a plurality of metadata nodes identified in files stored in one or more directories in a file system of a storage device is received. At least some of the metadata nodes include one or more attribute-value pairs. Based on the hierarchy of the plurality of metadata nodes identified in the files, the object is generated. The object includes each attribute-value pair from each metadata node in a path of metadata nodes from a root metadata node to an object metadata node that corresponds to the object. The object is sent to a destination.

14 Claims, 12 Drawing Sheets

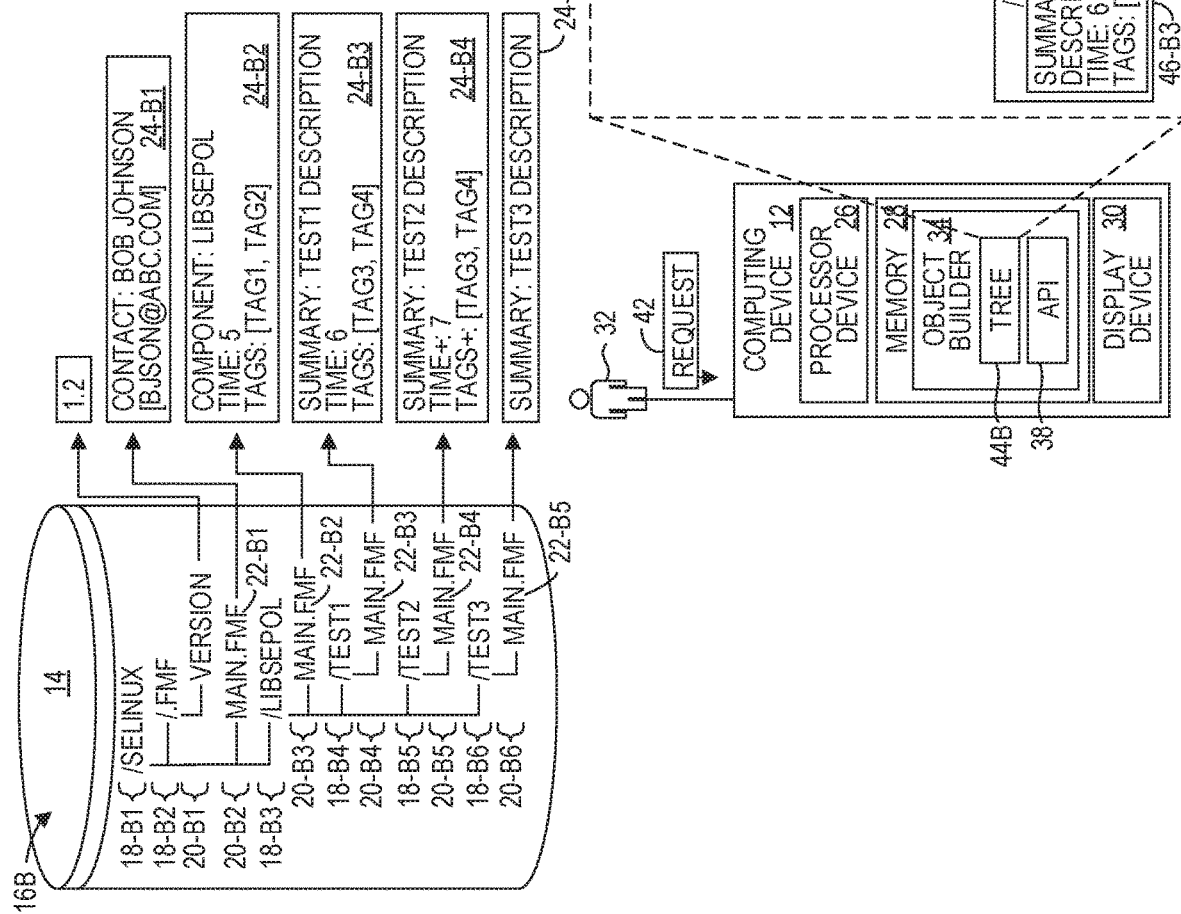

OBJECT CREATION FROM HIERARCHICAL METADATA STORED ON A STORAGE DEVICE

BACKGROUND

As electronic systems, such as software systems, increase in size, they similarly increase in complexity. Such large scale systems may be produced, maintained, improved, and/or used by a large number of individuals. It is often important to maintain data that relates to such large scale systems, for training purposes, maintenance purposes, and the like. As such systems grow in size, it becomes increasingly important that such data be organized in a sensible, intuitive, and scalable manner so that the data can be readily accessed rapidly, efficiently, and with minimal redundancy.

SUMMARY

The examples herein relate to generating objects based on metadata identified in files that may be stored in one or more directories of a file system of a storage device. The metadata is stored in a hierarchy of metadata nodes and implements inheritance features such that objects created from metadata nodes inherit data stored in any metadata node from a root metadata node to a leaf metadata node, greatly reducing redundancy and allowing such metadata to be organized along the same structure as the system about which the metadata relates.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 3A and 3B are block diagrams of an environment illustrating object creation from hierarchical metadata stored on a storage device that includes inheritance override and inheritance addition features;

DETAILED DESCRIPTION

Figure 1:
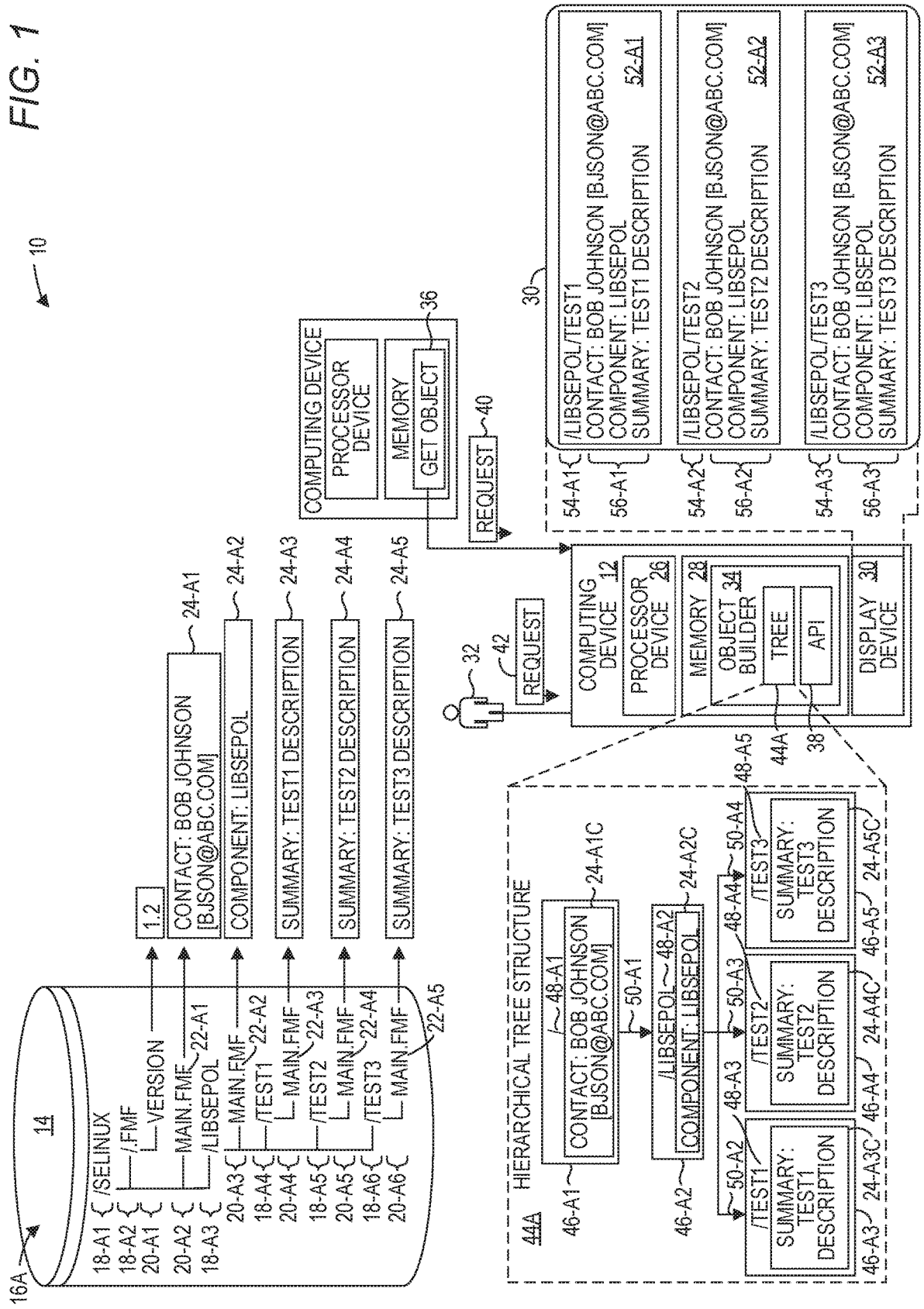
FIG. 1 is a block diagram of an environment in which object creation from hierarchical metadata stored on a storage device may be implemented according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message", and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As electronic systems, such as software systems, increase in size they similarly increase in complexity. Such large scale systems may be produced, maintained, improved, and/or used by a large number of individuals. It is often important to maintain data that relates to such large scale systems, for training purposes, maintenance purposes, and the like. As such systems grow in size, it becomes increasingly important that such data be organized in a sensible, intuitive, and scalable manner so that the data can be readily accessed rapidly, efficiently, and with minimal redundancy.

As an example, an operating system (OS) distribution may involve hundreds or thousands of different OS modules that are continually revised in response to customer problems and to enhance functionality, and that must be tested prior to widespread customer release. The OS modules may be stored across many different directories of one or more file systems. A given OS module may have hundreds or thousands of tests that are run against the OS module prior to customer release. The tests may also be spread across many different directories of one or more file systems depending on the file system locations of the particular modules being tested. Often information is maintained about such tests, such as a contact person responsible for the tests, environmental parameters that may be used in the tests, and the like. Information about an entity, such as information about a test or information about any other entity, may be referred to herein as metadata. Such metadata is commonly maintained in data files separate from the test files, and it is common that information in such data files are, as systems grow, duplicated across many data files. Such duplication can include information that identifies the individual responsible for the tests, certain environmental variables, and the like. If this information needs to be changed, hundreds or thousands of data files may need to be located and updated. For large-scale systems this is a substantial burden and often results in some data files not being updated, which can lead to subsequent problems.

The examples herein relate to generating objects based on metadata identified in files that may be stored in one or more directories of a file system of a storage device. The metadata is stored in a hierarchy of metadata nodes and implements inheritance features such that objects created from metadata nodes inherit data stored in any metadata node from a root metadata node to a leaf metadata node, greatly reducing redundancy and allowing such metadata to be organized along the same structure as the system about which the metadata applies.

In some examples, data may be stored in metadata nodes in the form of inheritable attribute-value pairs, and objects that are generated from the metadata nodes inherit each attribute-value pair from each metadata node in the path of metadata nodes from the root metadata node to the leaf metadata node. Among other advantages, the examples disclosed herein greatly reduce redundancy, and allow relevant metadata to be organized and distributed (i.e., scattered) among various directories of a file system as desired, but which can be automatically integrated into a single object upon request. In some examples disclosed herein, attribute-value pairs of a child metadata node may override values provided in an attribute-value pair of an ancestor metadata node, thereby allowing higher level metadata nodes to provide default values that may be overridden, if appropriate, by lower level metadata nodes. Additional aspects, features and advantages of the disclosed examples are provided below.

Combining the file system directory hierarchy with a metadata node hierarchy defined inside files enables users to distribute data across the file system in a flexible way which allows efficient maintenance and prevents data duplication.

FIG. 1 is a block diagram of an environment 10 in which object creation from hierarchical metadata stored on a storage device may be implemented according to some examples. The environment 10 includes a computing device 12 that is communicatively coupled to a storage device 14. The storage device 14 may be integrated into the computing device 12 or may be communicatively coupled to the computing device 12 via, for example, a network (not illustrated). The storage device 14 includes a file system that implements a hierarchy 16A of a plurality of directories 18-A1-18-A6 (generally, directories 18), and a plurality of files 20-A1-20-A6 (generally, files 20). Throughout the drawings, the contents of a file 20 may be indicated by a box containing text that is pointed to by an arrow that extends from the corresponding file 20 to the box. The file system may be any directory-based file system, such as, by way of non-limiting example, a Linux file system, a Unix file system, a Windows® file system, or the like. The term "directory" as used herein refers to a logical organization on the storage device 14 that is generated and maintained by the file system. A directory 18 may contain other directories 18 and/or may contain one or more files 20. A directory 18, when visually depicted on a display device, is sometimes referred to as a "folder" and may depict a folder icon that represents the directory 18.

For purposes of illustration, throughout the figures the directories 18 are denoted with a forward slash "/" and a label to easily distinguish a directory 18 in the file system from a file 20. For example, the directory 18-A1 is denoted with the forward slash and the label "SELINUX". The directories 18 establish the hierarchy 16A of directories 18 in the file system. A directory 18 may be referred to herein as a parent directory 18 with reference to other directories 18 that are within the parent directory 18. A directory 18 may be referred to as a child directory 18 with reference to the directory 18 in which the child directory 18 is contained. A directory 18 may concurrently be a parent directory 18 to one or more child directories 18, and a child directory 18 to a parent directory 18. All directories 18 that are at a higher hierarchical level than a given directory 18, but that are in a path from a root directory to the given directory 18 may be referred to as ancestor directories. All directories 18 that are at a lower hierarchical level than a given directory 18, but that are in a path from the given directory 18 to an end directory 18, sometimes referred to as a leaf directory 18, may be referred to as descendent directories 18.

The hierarchy of directories 18 may be referred to as a tree that has a root node directory 18, in this case the directory 18-A1, and several branches that extend from the directory 18-A1 or from descendent directories 18, to leaf (e.g., end) directories 18. A leaf directory 18 is a directory 18 that has no child directories 18. In this example, the file hierarchy 16A, starting with the directory 18-A1, includes four branches, or paths, that extend from the directory 18-A1 to a leaf directory 18. A first branch, or path, comprises the directories 18-A1 and 18-2, a second branch comprises the directories 18-A1, 18-A3 and 18-A4, a third branch comprises the directories 18-A1, 18-A3 and 18-A5, and the fourth branch comprises the directories 18-A1, 18-A3 and 18-A6. Each of directories 18-A2 and 18-A4-18-A6 are leaf directories because such directories 18 have no child directories 18.

The files 20-A2-20-A6 identify a plurality of metadata nodes 22-A1-22-A5 (generally, metadata nodes 22). As will be discussed in greater detail herein, the examples allow a metadata node 22 to be defined in a file 20 using any of three mechanisms. One mechanism involves the use of a file 20 having a predetermined name, in this example, "MAIN.FMF", although the examples disclosed herein may be used with any predetermined name. A file 20 having the name "MAIN.FMF" defines, and corresponds to, a metadata node 22. In this mechanism, the name of the metadata node 22 is the name of the directory 18 in which the file 20 exists. For example, the file 20-A3 defines a metadata node 22-A2 because the name of the file 20-A3 is "MAIN.FMF". Because the file 20-A3 is contained within the directory 18-A3 that has the name "LIBSEPOL", the name of the metadata node 22-A2 is "LIBSEPOL".

Similarly, the file 20-A2, also named "MAIN.FMF" but contained in the directory 18-A1 defines a metadata node 22-A1. As will be discussed in greater detail herein, the directory 18-A1 is a "root" metadata directory 18. In some examples, for purposes of metadata names, the root metadata directory 18 is treated differently from all other directories 18, and the name of the metadata node 22-A1 is "/" to designate that the metadata node 22-A1 as the root metadata node 22. As will be discussed below, the metadata nodes 22 form a hierarchy, and the root metadata node 22-A1 is at the top of the hierarchy.

Figure 4:
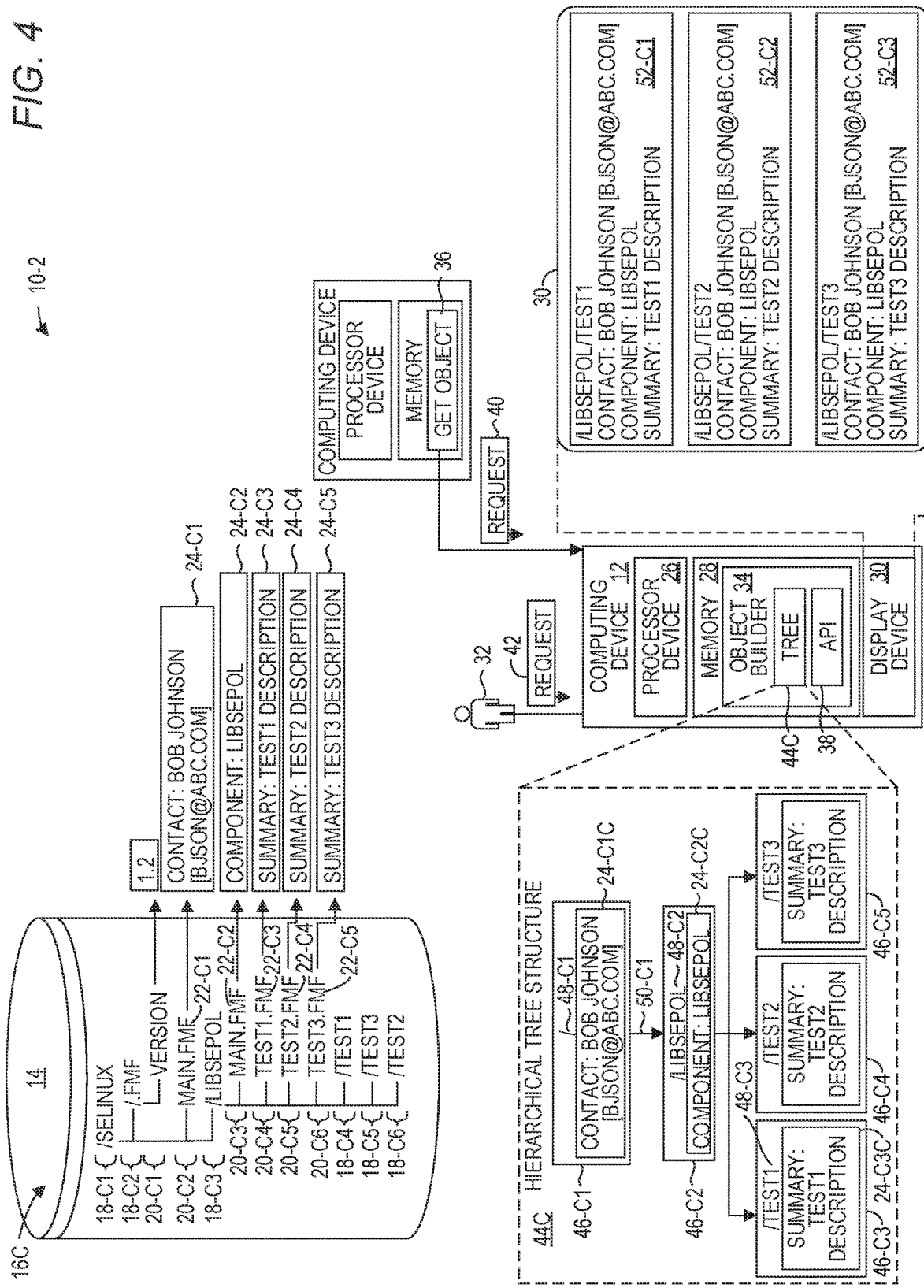
FIG. 4 is a block diagram of an environment in which object creation from hierarchical metadata stored on a storage device may be implemented according to additional examples.

A second mechanism for defining metadata nodes 22, discussed with regard to FIG. 4, is via a file 20 that has the ".FMF" extension, but has a name, any name, other than the name "MAIN". A third mechanism for defining metadata nodes 22, discussed with regard to FIG. 5, allows a metadata node 22 to be defined inside a file 20 that has the predetermined name "MAIN.FMF" or a file 20 that has the ".FMF" extension, but a different name than "MAIN".

Metadata nodes 22 include information in the form of "attribute-value pairs" that are identified in the file 20 that defines the metadata node 22. An "attribute-value pair" includes two pieces of information, an attribute, and a value. The attribute-value pairs may be defined using any syntax. In some examples, the attribute-value pairs are defined using a YAML syntax. As an example, the metadata node 22-A1 includes an attribute-value pair 24-A1 "CONTACT: BOB JOHNSON [BJSON@ABC.COM]". In the attribute-value pair 24-A1, "CONTACT" is the attribute and "BOB JOHNSON [BJSON@ABC.COM]" is the value, the attribute and the value being separated by a colon ":". The metadata node 22-A2 has the attribute-value pair 24-A2 wherein the attribute is "COMPONENT" and the value is "LIBSEPOL". The metadata node 22-A3 has the attribute-value pair 24-A3 wherein the attribute is "SUMMARY" and the value is "TEST1 DESCRIPTION". The metadata node 22-A4 has the attribute-value pair 24-A4 wherein the attribute is "SUMMARY" and the value is "TEST2 DESCRIPTION". The metadata node 22-A5 has the attribute-value pair 24-A5 wherein the attribute is "SUMMARY" and the value is "TEST3 DESCRIPTION".

As will be discussed in greater detail herein, the metadata nodes 22 form a hierarchy based at least in part on the hierarchy 16A of the plurality of directories 18. Thus, a metadata node 22 may be a parent metadata node 22 to a child metadata node 22, and concurrently be a child metadata node 22 to a parent metadata node 22. In this example, the metadata node 22-A1 is a root metadata node 22, and thus has no parent metadata node 22. Metadata nodes 22 that have no children metadata nodes 22 may be referred to as leaf metadata nodes 22. In this example, metadata nodes 22-A3-22-A5 are leaf metadata nodes 22. As discussed above with regard to directories 18, all metadata nodes 22 that are at a higher hierarchical level than a given metadata node 22, but that are in a path from a root metadata node 22 to the given metadata node 22, may be referred to as ancestor metadata nodes 22 with respect to the given metadata node 22. All metadata nodes 22 that are at a lower hierarchical level than a given metadata node 22, but that are in a path from the given metadata node 22 to a leaf metadata node 22, may be referred to as descendent metadata nodes 22 with respect to the given metadata node 22.

The computing device 12 includes a processor device 26 that is coupled to a memory 28. The computing device 12 may also include a display device 30 for presentation of information, such as the presentation of objects that are generated from the metadata nodes 22, to an operator 32. An object builder 34 is a component of the computing device 12 that, as described in greater detail below, builds objects from metadata nodes 22 based on the hierarchy of the metadata nodes 22. The object builder 34 may then send the objects to a destination, such as the display device 30 and to an external application 36. The object builder 34 may include an application programming interface (API) 38 that can be called (e.g., via a request 40) by the external application 36 to generate and retrieve objects based on the hierarchy of the plurality of metadata nodes 22. The object builder 34 may also send objects to the display device 30 in response to a request 42 from the operator 32.

As will be described in greater detail herein, an object can be generated from the hierarchy of the metadata nodes 22. An object corresponds to a particular metadata node 22, and includes all metadata from the metadata node 22 to which the object corresponds, as well as all ancestor metadata nodes 22 of the corresponding metadata node 22. In some implementations, only leaf objects may be generated that correspond to leaf metadata nodes 22. Such objects may be referred to as "leaf objects" because they correspond to leaf metadata nodes 22. In other implementations, objects can correspond to any metadata node 22 at any level of the hierarchy of metadata nodes 22.

As an example of object generation, assume that the operator 32 requests presentation of all leaf objects that can be generated from the hierarchy of metadata nodes 22. In this simplistic example, leaf objects can be generated from the three leaf metadata nodes 22-A3-22-A5. The request can be in accordance with any desired syntax. In one example, a request to generate all the leaf objects may be in the form of a "LS" command that is provided by the operator 32 to the object builder 34.

Upon receipt of the LS command, in some examples, the object builder 34 generates a hierarchical tree structure 44A of in-memory nodes 46-A1-46-A5 (generally in-memory nodes 46), each of which corresponds to a metadata node 22 and which mirrors the hierarchy of the metadata nodes 22. Each in-memory node 46 includes a name that corresponds to the corresponding metadata node 22 and the attribute-value pairs of the corresponding metadata node 22.

To generate the hierarchical tree structure 44A, the object builder 34 accesses the storage device 14 and determines a metadata root directory 18 of the hierarchy 16A of directories 18. The metadata root directory 18 may be designated in any desired manner. In the examples disclosed herein, by convention, the metadata root directory 18 is identified by the existence of a child directory 18 having a predetermined name, in this example, ".FMF". Thus, in this example, the directory 18-A1 is the metadata root directory because the directory 18-A1 has a child directory 18-A2 with the name ".FMF". In some examples, the child directory 18-A2 may include the file 20-A1 with the predetermined name "VERSION" that identifies a particular version of the format of the metadata nodes 22. Note that the directory 18-A1 is a metadata root directory 18, but may not be the file system root directory 18 of all directories 18 contained on the storage device 14. Thus, the metadata root directory 18 may be different from the file system root directory 18 of the storage device 14.

The object builder 34 then searches the root directory 18-A1 for a file 20 with a predetermined name, in this example "MAIN.FMF". The object builder 34 locates the file 20-A2. The object builder 34 then generates the in-memory node 46-A1 that corresponds to the file 20-A2, and provides a label, or name 48-A1 of "/" to identify the in-memory node 46-A1 as the root in-memory node 46 of the hierarchical tree structure 44A. The object builder 34 obtains the attribute-value pair 24-A1 from the file 20-A2 and stores a copy of the attribute-value pair 24-A1 as an attribute-value pair 24-A1C in the in-memory node 46-A1. As will be discussed in greater detail below, the object builder 34 may further analyze the file 20-A2 for additional metadata nodes 22 that may be defined in the file 20-A2, however, in this example, the file 20-A2 does not define any additional metadata nodes 22.

The object builder 34 then searches the directory 18-A1 for any files 20 that have the predetermined extension ".FMF" and have a name other than "MAIN.FMF". In this example, there are no such files 20.

The object builder 34 then accesses the child directory 18-A3 of the directory 18-A1. The object builder 34 then searches the child directory 18-A3 for a file 20 with the predetermined name "MAIN.FMF" and locates the file 20-A3. The object builder 34 generates an in-memory node 46-A2 that corresponds to the file 20-A3, and provides a label, or name 48-A2 of "/LIBSEPOL" based on the name of the directory 18-A3 in which the file 20-A3 is contained. Thus, other than the root directory 18-A1, each metadata node 22 that corresponds to a file 20 having the predetermined name "MAIN.FMF" inherits the name of the directory 18 in which the file 20 having the predetermined name "MAIN.FMF" is contained. The object builder 34 obtains the attribute-value pair 24-A2 from the file 20-A3 and stores a copy of the attribute-value pair 24-A2 as an attribute-value pair 24-A2C in the in-memory node 46-A2. The object builder 34 establishes a link 50-A1 in the hierarchical tree structure 44A to establish the parent-child relationship between the in-memory node 46-A1 and the in-memory node 46-A2. The object builder 34 then searches the directory 18-A1 for any files 20 that have the predetermined extension ".FMF" and have a name other than "MAIN.FMF". In this example, there are no such files 20.

The object builder 34 then accesses the first child directory 18-A4 of the directory 18-A3 and repeats the process discussed above with the directory 18-A3. This results in the generation of an in-memory node 46-A3 that has a name 48-A3 of "/TEST1" and an attribute-value pair 24-A3C which is a copy of the attribute-value pair 24-A3. The object builder 34 also establishes a link 50-A2 in the hierarchical tree structure 44A to establish the parent-child relationship between the in-memory node 46-A2 and the in-memory node 46-A3.

The object builder 34 then accesses the second child directory 18-A5 of the directory 18-A3 and repeats the process discussed above with the directory 18-A4. This results in the generation of an in-memory node 46-A4 that has a name 48-A4 of "/TEST2" and an attribute-value pair 24-A4C which is a copy of the attribute-value pair 24-A4. The object builder 34 also establishes a link 50-A3 in the hierarchical tree structure 44A to establish the parent-child relationship between the in-memory node 46-A2 and the in-memory node 46-A4.

The object builder 34 then accesses the third child directory 18-A6 of the directory 18-A3 and repeats the process discussed above with the directory 18-A5. This results in the generation of an in-memory node 46-A5 that has a name 48-A5 of "/TEST3" and an attribute-value pair 24-A5C which is a copy of the attribute-value pair 24-A5. The object builder 34 also establishes a link 50-A4 in the hierarchical tree structure 44A to establish the parent-child relationship between the in-memory node 46-A2 and the in-memory node 46-A5.

Since the directories 18-A4-18-A6 are leaf directories 18, the object builder 34 accesses the directory 18-A3 to determine if other child directories 18 exist in the directory 18-A3. The object builder 34 determines that there are no child directories 18 in the directory 18-A3. The object builder 34 then accesses the parent directory 18-A1 of the directory 18-A3 to determine if other child directories 18 exist in the directory 18-A1, other than the directory 18-A2 which was previously processed to determine that the directory 18-A1 is the root metadata directory. If additional child directories 18 existed in the directory 18-A1, each additional child directory 18 would be processed identically to the processing of the child directory 18-A3. In this way, the object builder 34 can build a hierarchical tree of in-memory nodes 46 that may include hundreds, or thousands, of in-memory nodes 46, each of which corresponds to a metadata node 22. In this example, however, only five metadata nodes 22 exist, and thus the object builder 34 is finished building the hierarchical tree structure 44A of in-memory nodes 46.

The object builder 34 now traverses the in-memory nodes 46 to generate and send a plurality of leaf objects 52-A1-52-A3 to a destination, in this example, the display device 30. In particular, the object builder 34 iteratively traverses the hierarchical tree structure 44A of in-memory nodes 46 and collects the names 48 and attribute-value pairs 24 of each in-memory node 46 in the path of in-memory nodes 46 from the root in-memory node 46-A1 to each leaf in-memory node 46-A3-46-A5, and generates an object 52 that corresponds to each leaf in-memory node 46-A3-46-A5 based on the path of in-memory nodes 46 from the root in-memory node 46-A1 to each leaf in-memory node 46-A3-46-A5.

As an example, the object builder 34 traverses the links 50-A1 and 50-A2 that establish the path of in-memory nodes 46-A1, 46-A2, and 46-A3 from the root in-memory node 46-A1 to the leaf in-memory node 46-A3, and generates the object 52-A1. The object 52-A1 has a name 54-A1 that is based on the names 48-A1, 48-A2, and 48-A3 of the in-memory nodes 46-A1, 46-A2, and 46-A3. The object 52-A1 has attribute-value pairs 56-A1 that were identified in the in-memory nodes 46-A1, 46-A2, and 46-A3.

The object builder 34 also traverses the links 50-A1 and 50-A3 that connect the path of in-memory nodes 46-A1, 46-A2, and 46-A4 from the root in-memory node 46-A1 to the leaf in-memory node 46-A4, and generates the object 52-A2. The object 52-A2 has a name 54-A2 that is based on the names 48-A1, 48-A2, and 48-A4 of the names of the in-memory nodes 46-A1, 46-A2, and 46-A4. The object 52-A2 has attribute-value pairs 56-A2 that were identified in the in-memory nodes 46-A1, 46-A2, and 46-A4. The object builder 34 also traverses the links 50-A1 and 50-A4 that connect the path of in-memory nodes 46-A1, 46-A2, and 46-A5 from the root in-memory node 46-A1 to the leaf in-memory node 46-A5, and generates the object 52-A3. The object 52-A3 has a name 54-A3 that is based on the names 48-A1, 48-A2, and 48-A5 of the names of the in-memory nodes 46-A1, 46-A2, and 46-A5. The object 52-A3 has attribute-value pairs 56-A3 that were identified in the in-memory nodes 46-A1, 46-A2 and 46-A5.

It should be noted that, while in this example the object builder 34 generated the hierarchical tree structure 44A in response to the request 42 from the operator 32, in other examples, the object builder 34 may generate the hierarchical tree structure 44A prior to receiving a request, such that the hierarchical tree structure 44A is already built upon receiving the request 42. Moreover, the object builder 34 need not rebuild the hierarchical tree structure 44A in response to each request, and may only rebuild the hierarchical tree structure 44A periodically, or in response to a command to do so.

Figure 2:
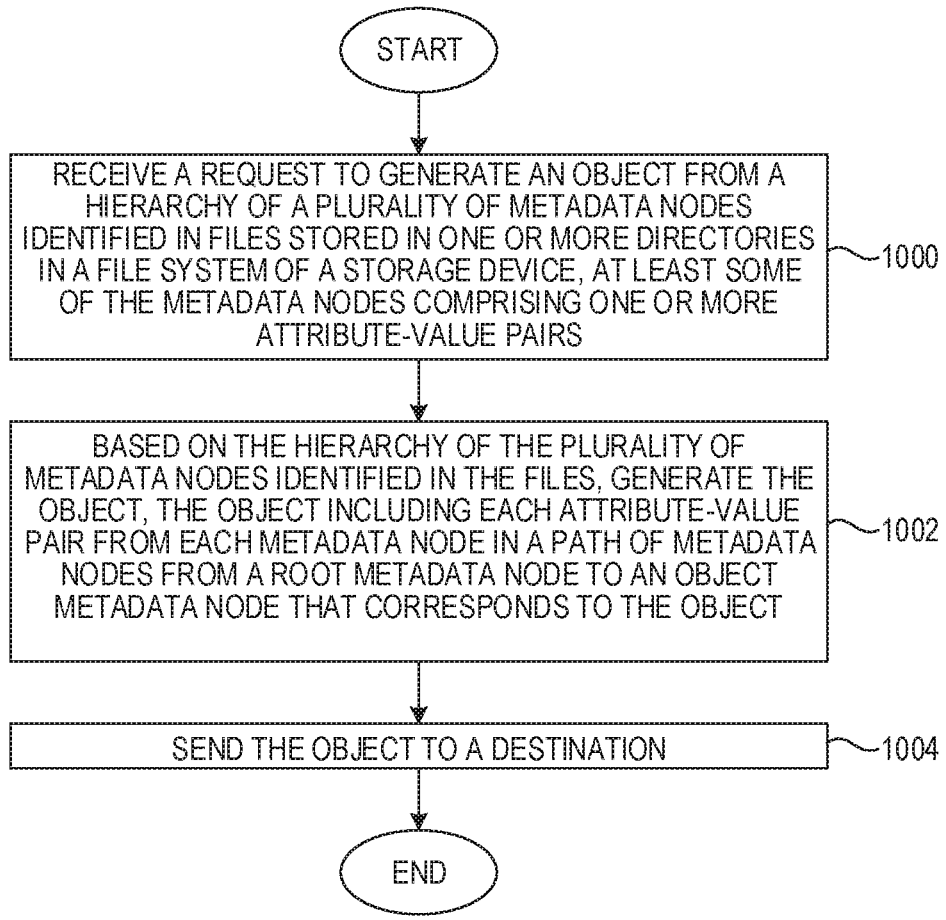
FIG. 2 is a flowchart of a method for object creation from hierarchical metadata stored on a storage device according to one example.

FIG. 2 is a flowchart of a method for object creation from hierarchical metadata stored on a storage device according to one example. FIG. 2 will be discussed in conjunction with FIG. 1. The object builder 34 receives the request 42 to generate an object 52 from the hierarchy of the plurality of metadata nodes 22 identified in the files 20 stored in the one or more directories 18 in the file system of the storage device 14. At least some of the metadata nodes 22 comprise one or more attribute-value pairs 24 (FIG. 2, block 1000). In this example, assume that the request is for all leaf objects that correspond to leaf metadata nodes 22, and thus the leaf metadata nodes 22 may be referred to as object metadata nodes 22-A3, 22-A4 and 22-A5. Note that in other examples, the operator may request the generation and presentation of all objects that can be generated from any metadata node 22, or, the operator 32 may enter the name of a particular metadata node 22 to direct the object builder 34 to generate a particular object only. For example, the operator may enter the name "/LIBSEPOL/TEST1" to direct the object builder 34 to generate an object that corresponds to the metadata node 22-A3.

Based on the hierarchy of the plurality of metadata nodes 22 identified in the files 20, the object builder 34 generates the objects 52, the objects 52 each including each attribute-value pair 24 from each metadata node 22 in the path of metadata nodes 22 from the root metadata node 22-A1 to the object metadata nodes 22-A3, 22-A4, and 22-A5, that correspond to the objects 52-A1, 52-A2, and 52-A3, respectively (FIG. 2, block 1002). As discussed with regard to FIG. 1, the object builder 34 may first generate the hierarchical tree structure 44A based on the hierarchy of the plurality of metadata nodes 22 identified in the files 20. In alternative examples, the object builder 34 may simply traverse the metadata nodes 22 and generate the objects 52 without the hierarchical tree structure 44A. In either implementation, the object builder 34 generates the objects 52 based on the hierarchy of the plurality of metadata nodes 22 identified in the files 20, since the hierarchical tree structure 44A is based on the hierarchy of the plurality of metadata nodes 22 identified in the files 20. The object builder 34 then sends the objects 52 to a destination, in this example, the display device 30 (FIG. 2, block 1004).

Figure 3B:
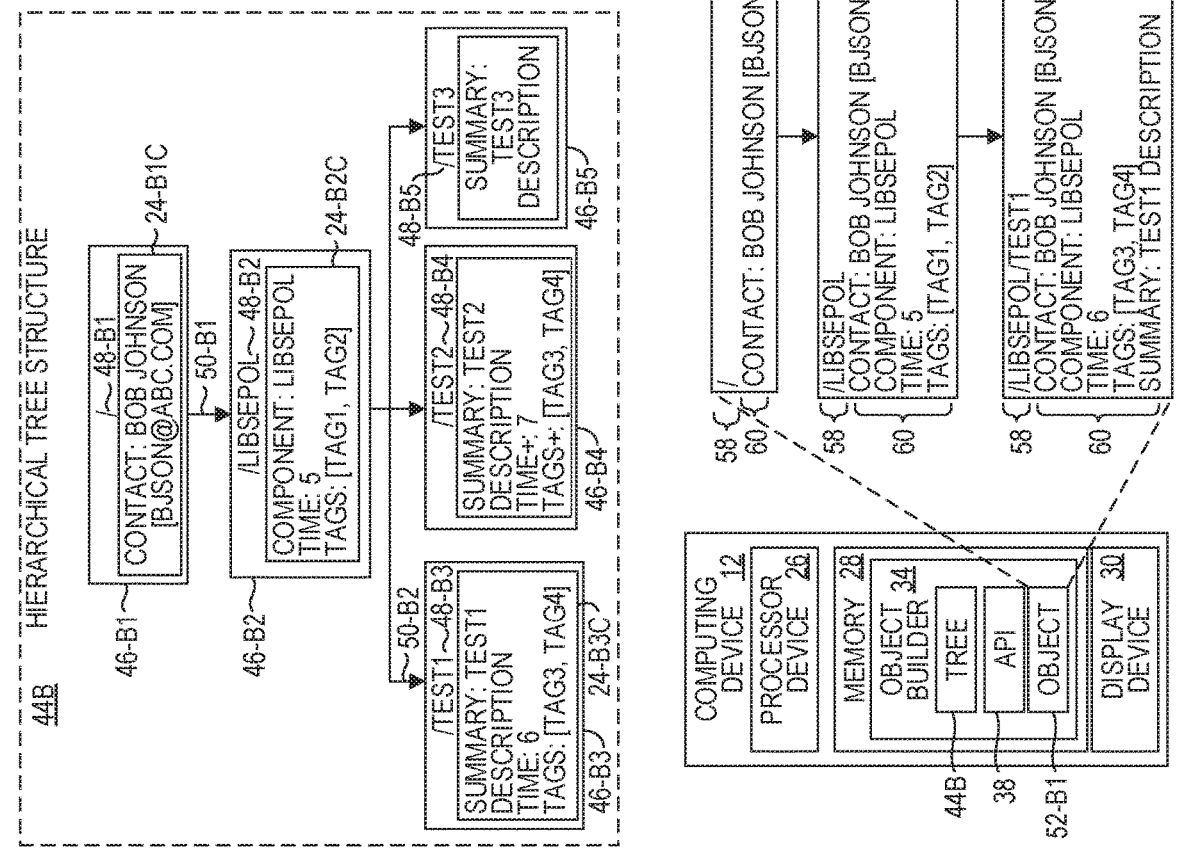

FIGS. 3A and 3B are block diagrams of an environment 10-1 illustrating object creation from hierarchical metadata stored on a storage device that includes inheritance override and inheritance addition features. FIGS. 3A and 3B are substantially similar to FIG. 1, except as otherwise discussed herein. Referring first to FIG. 3A, the environment 10-1 includes the computing device 12 and the storage device 14 that has a hierarchy 166 of directories 18-B1-18-B6 that contain one or more files 20-B1-20-B6. The directories 18 and the files 20 are identical to the directories 18 and the files 20 illustrated in FIG. 1, except for the contents of the files 20-B3, 20-B4, and 20-B5. The files 20 correspond to a hierarchy of metadata nodes 22-B1-22-B5, which, solely for purposes of illustration, establish an identical hierarchy as the metadata nodes 22-A1-22-A5 illustrated in FIG. 1. The metadata nodes 22-B1-22-B5 include respective attribute-value pairs 24-B1-24-B5.

In this example, the metadata node 22-B2 that corresponds to the file 20-B3 has three attribute-value pairs 24-B2, "COMPONENT: LIBSEPOL", "TIME: 5" and "TAGS: [TAG1, TAG2]". The metadata node 22-B3 that corresponds to the file 20-B4 has three attribute-value pairs 24-B3, "SUMMARY: TEST1 DESCRIPTION", "TIME: 6", and "TAGS: [TAG3, TAG4]". The metadata node 22-B4 that corresponds to the file 20-B5 has three attribute-value pairs 24-B4, "SUMMARY: TEST2 DESCRIPTION", "TIME+: 7" and "TAGS+: [TAG3, TAG4]". The attribute-value pair "TIME+: 7" includes the addition operator "+". Because the value "7" is numeric, the addition operator means that the value, in this case "7", is to be added (i.e., summed) to the value of the attribute TIME as the object corresponding to the metadata node 22-B4 is being generated. In other words, if an ancestor metadata node 22 has the identical attribute, TIME, the value 7 should be added to the value identified in the ancestor metadata node 22. The attribute-value pair "TAGS+: [TAG3, TAG4]" also includes the addition operator "+". Because the value of the attribute "TAGS" is a list (denoted by the use of brackets), the addition operator in this context means that the list items, in this case "[TAG3, TAG4]" are to be added (i.e., concatenated) to the current list associated with the attribute "TAGS" in the object corresponding to the metadata node 22-B4 as the object is being generated.

The computing device 12 builds a hierarchical tree structure 44B of in-memory nodes 46-B1-46-B5 based on the hierarchy of the metadata nodes 22 using the same process as described above with regard to building the hierarchical tree structure 44A. The hierarchical tree structure 44B has a same structure as the hierarchical tree structure 44A because the hierarchy of the metadata nodes 22 in the hierarchy 16B is the same as the hierarchy of the metadata nodes 22 in the hierarchy 16A (FIG. 1). Each in-memory node 46-B1-46-B5 contains the attribute-value pairs 24-B1-24-B5 from the corresponding metadata nodes 22-B1-22-B5.

To illustrate features of inheritance override and inheritance addition, the generation of an object will now be described in detail. Assume that the object builder 34 is requested to generate objects for each leaf metadata node 22-B3-22-B5. Referring now to FIG. 3B, the object builder 34 accesses the hierarchical tree structure 44B, and accesses the in-memory node 46-B1. The object builder 34, at a time T1, stores the name 48-B1 ("/") of the in-memory node 46-B1 in a name field 58 of an object 52-B1. The object builder 34, at the time T1, also stores the attribute-value pair 24-B1C ("CONTACT: BOB JOHNSON [BJSON@ABC.COM]") from the in-memory node 46-B1 in an attribute-value pair field 60 of the object 52-B1.

The object builder 34 then follows the link 50-B1 to the in-memory node 46-B2. The object builder 34, at a time T2, appends the name 48-B2 ("/LIBSEPOL") of the in-memory node 46-B2 to the name of the in-memory node 46-B1 in the name field 58 of the object 52-B1. The object builder 34, at the time T2, accesses the attribute-value pairs 24-B2C "COMPONENT: LIBSEPOL", "TIME: 5" and "TAGS: [TAG1, TAG2]" from the in-memory node 46-B2, and examines the attribute-value pair field 60 to determine if any of the attributes "COMPONENT", "TIME" or "TAGS" have been previously stored in the attribute-value pair field 60 due to such attributes having identified in an ancestor in-memory node 46 in the path of in-memory nodes 46. In this example, the object builder 34 determines that the attributes "COMPONENT", "TIME" or "TAGS" have not been previously stored in the attribute-value pair field 60, and thus stores the attribute-value pairs 24-B2C in the attribute-value pair field 60 of the object 52-B1.

The object builder 34 then follows the link 50-B2 to the in-memory node 46-B3. The object builder 34, at a time T3, appends the name 48-B3 ("/TEST1") of the in-memory node 46-B3 to the name of the in-memory node 46-B1 and the name of the in-memory node 46-B2 in the name field 58 of the object 52-B1. The object builder 34, at the time T3, accesses the attribute-value pairs 24-B3C "SUMMARY: TEST1 DESCRIPTION", "TIME: 6" and "TAGS: [TAG3, TAG4]" of the in-memory node 46-B3, and examines the attribute-value pair field 60 to determine if any of the attributes "SUMMARY", "TIME" or "TAGS" have been previously stored in the attribute-value pair field 60 due to such attributes having been identified in an ancestor in-memory node 46 in the path of in-memory nodes 46. In this example, the object builder 34 determines that an attribute-value pair having the attribute "TIME" has previously been stored in the object 52-B1. The attribute-value pair "TIME: 6" in the attribute-value pairs 24-B3C do not use the addition ("+") operator, so the object builder 34 replaces the current value ("5") identified as the value of the attribute "TIME" in the object 52-B1 with the value ("6"). Similarly, the object builder 34 determines that an attribute-value pair having the attribute "TAGS" has previously been stored in the object 52-B1. The attribute-value pairs 24-B3C do not use the addition ("+") operator, so the object builder 34 replaces (sometimes referred to as "overrides") the current value ("TAG1, TAG2") identified as the value of the attribute "TAGS" in the object 52-B1 with the value ("TAG3, TAG4"). The object builder 34 then determines that the in-memory node 46-B3 is a leaf in-memory node 46 and has no child in-memory nodes 46. The object builder 34 then sends the object 52-B1 to, in this example, the display device 30. As depicted on the display device 30, the object 52-B1 includes a name 54-B1 that is based on the names 48-B1, 48-B2 and 48-B3 of the in-memory nodes 46-B1, 46-B2 and 46-B3. The object 52-B1 has attribute-value pairs 56-B1 that were identified in the in-memory nodes 46-B1, 46-B2 and 46-B3, and have values that were overridden as discussed above.

The object builder 34 generates objects 52-B2 and 52-B3 similarly, and sends such objects 52 to the display device 30. However, when processing the in-memory node 46-B4 when generating the object 52-B2, the object builder 34 determines that the attribute-value pair "TIME+: 7" uses the addition operator ("+"), and rather than replace the value 5 identified in the parent in-memory node 46-B2 with the value 7, the object builder 34 sums the two values 5 and 7 and stores a value of 12 in the object 52-B2. Similarly, the object builder 34 determines that the attribute-value pair "TAGS+: [TAG3, TAG4]" in the in-memory node 46-B4 uses the addition operator ("+"), and the object builder 34 concatenates the values "TAG3, TAG4" to the list "TAG1, TAG2" already stored in the object 52-B2 based on the attribute-value pairs 24-B2C in the in-memory node 46-B2.

FIG. 4 is a block diagram of an environment 10-2 in which object creation from hierarchical metadata stored on a storage device may be implemented according to additional examples. FIG. 4 is substantially similar to FIG. 1, except as otherwise discussed herein. In this example the storage device 14 includes a file system that implements a hierarchy 16C of a plurality of directories 18-C1-18-C6 (generally, directories 18), and a plurality of files 20-C1-20-C6 (generally, files 20). The environment 10-2 illustrates a second mechanism for defining metadata nodes 22, discussed above, regarding the use of a file that has the ".FMF" extension, but a different name than "MAIN". This mechanism allows two hierarchical levels of metadata nodes 22 to be established in a single directory 18.

To generate a hierarchical tree structure 44C, the object builder 34 accesses the storage device 14 and determines a metadata root directory 18 of the hierarchy 16C of directories 18. Again, in this example, the directory 18-C1 is the metadata root directory 18 because the directory 18-C1 has a child directory 18-C2 with the name ".FMF". The object builder 34 then searches the root directory 18-C1 for a file with a predetermined name, in this example "MAIN.FMF". The object builder 34 locates the file 20-C2. The object builder 34 then generates the in-memory node 46-C1 that corresponds to the file 20-C2, and provides a label, or name 48-C1 of "/" to identify the in-memory node 46-C1 as the root in-memory node 46C of the hierarchical tree structure 44C. The object builder 34 obtains the attribute-value pair 24-C1 from the file 20-C2 and stores a copy of the attribute-value pair 24-C1 as an attribute-value pair 24-C1C in the in-memory node 46-C1. The object builder 34 then searches the directory 18-C1 for any files 20 that have the predetermined extension ".FMF" and have a name other than "MAIN.FMF". In this example, there are no such files 20 in the directory 18-C1. The object builder 34 then accesses the child directory 18-C3 of the directory 18-C1. The object builder 34 then searches the child directory 18-C3 for a file 20 with the predetermined name "MAIN.FMF" and locates the file 20-C3. The object builder 34 then generates the in-memory node 46-C2 that corresponds to the file 20-C3, and provides a label, or name 48-C2 of "/LIBSEPOL" based on the name of the directory 18-C3 in which the file 20-C3 is contained. The object builder 34 obtains the attribute-value pair 24-C2 from the file 20-C3 and stores a copy of the attribute-value pair 24-C2 as an attribute-value pair 24-C2C in the in-memory node 46-C2. The object builder 34 establishes a link 50-C1 in the hierarchical tree structure 44C to establish the parent-child relationship between the in-memory node 46-C1 and the in-memory node 46-C2.

The object builder 34 then searches the directory 18-C3 for any files 20 that have the predetermined extension ".FMF" and have a name other than "MAIN.FMF". In this example, the object builder 34 identifies the file 20-C4 as a file 20 that has a predetermined extension ".FMF" and has a name other than "MAIN.FMF". The object builder 34 then generates the in-memory node 46-C3 that corresponds to the file 20-C4, and provides a label, or name 48-C3 of "/TEST1" based on the name of the file 20-C4. Thus, each metadata node 22 that corresponds to a file 20 having the predetermined extension ".FMF" and a name other than "MAIN.FMF" inherits the name of the file 20. The object builder 34 obtains an attribute-value pair 24-C3 from the file 20-C4 and stores a copy of the attribute-value pair 24-C3 as an attribute-value pair 24-C3C in the in-memory node 46-C3. The object builder 34 similarly processes the files 20-C4 and 20-C5, and generates corresponding in-memory nodes 46-C4 and 46-C5. The object builder 34 determines that there are no other files 20 that have the predetermined extension ".FMF" and a name other than "MAIN.FMF". The object builder 34 then accesses each of the directories 18-C4, 18-C5, and 18-C6, and determines that none of the directories 18-C4, 18-C5, and 18-C6 have a file 20 with the predetermined name "MAIN.FMF" or a file 20 having the predetermined extension ".FMF" and a name other than "MAIN.FMF". The object builder 34 also determines that the directory 18-C1 has no additional child directories 18, and thus determines that the hierarchical tree structure 44C is complete.

The object builder 34 may then generate objects 52-C1-52-C3 in response to a request, and send the objects 52-C1-52-C3 to the display device 30. Note that despite defining the plurality of metadata nodes 22-C1-22-C5 differently from that discussed above with regard to FIG. 1, the metadata nodes 22-C1-22-C5 have the same hierarchy and same attribute-value pairs as the metadata nodes 22-A1-22-A5 illustrated in FIG. 1, and thus the hierarchical tree structure 44C is identical to the hierarchical tree structure 44A, and the objects 52-C1-52-C3 are identical to the objects 52-A1-52-A3, respectively.

Figure 5:
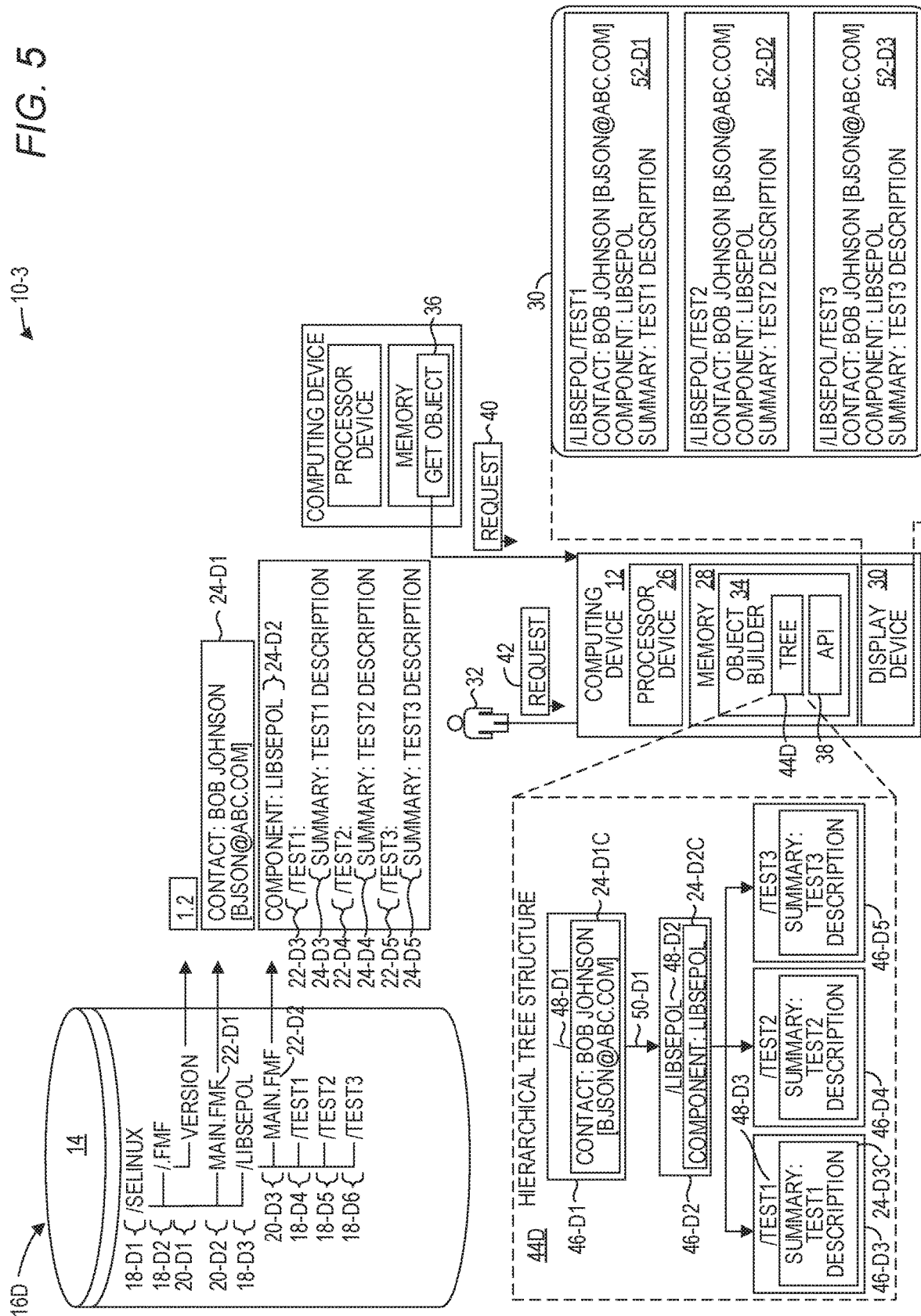
FIG. 5 is a block diagram of an environment in which object creation from hierarchical metadata stored on a storage device may be implemented according to additional examples.

FIG. 5 is a block diagram of an environment 10-3 in which object creation from hierarchical metadata stored on a storage device may be implemented according to additional examples. FIG. 5 is substantially similar to FIG. 1, except as otherwise discussed herein. In this example the storage device 14 includes a file system that implements a hierarchy 16D of a plurality of directories 18-D1-18-D6 (generally, directories 18), and a plurality of files 20-D1-20-D3 (generally, files 20). The environment 10-3 illustrates a third mechanism for defining metadata nodes, discussed above, regarding the definition of a metadata node inside a file 20 that has the predetermined name "MAIN.FMF". This mechanism allows any number of hierarchical levels of metadata nodes 22 to be established in a single file 20.

To generate a hierarchical tree structure 44D, the object builder 34 accesses the storage device 14 and determines a metadata root directory 18 of the hierarchy 16D of directories 18. Again, in this example, the directory 18-D1 is the metadata root directory 18 because the directory 18-D1 has a child directory 18-D2 with the name ".FMF". The object builder 34 then searches the root directory 18-D1 for a file with a predetermined name, in this example "MAIN.FMF". The object builder 34 locates the file 20-D2. The object builder 34 then generates the in-memory node 46-D1 that corresponds to the file 20-D2, and provides a label, or name 48-D1 of "/" to identify the in-memory node 46-D1 as the root in-memory node 46 of the hierarchical tree structure 44D. The object builder 34 obtains the attribute-value pair 24-D1 from the file 20-D2 and stores a copy of the attribute-value pair 24-D1 as an attribute-value pair 24-D1C in the in-memory node 46-D1. The object builder 34 then searches the directory 18-D1 for any files 20 that have the predetermined extension ".FMF" and have a name other than "MAIN.FMF". In this example, there are no such files 20 in the directory 18-D1.

The object builder 34 then accesses the child directory 18-D3 of the directory 18-D1. The object builder 34 then searches the child directory 18-D3 for a file 20 with the predetermined name "MAIN.FMF" and locates the file 20-D3. The object builder 34 then generates the in-memory node 46-D2 that corresponds to the file 20-D3, and provides a label, or name 48-D2 of "/LIBSEPOL" based on the name of the directory 18-D3 in which the file 20-D3 is contained. The object builder 34 obtains the attribute-value pair 24-D2 from the file 20-D3 and stores a copy of an attribute-value pair 24-D2 as an attribute-value pair 24-D2C in the in-memory node 46-D2. The object builder 34 establishes a link 50-D1 in the hierarchical tree structure 44D to establish the parent-child relationship between the in-memory node 46-D1 and the in-memory node 46-D2.

The object builder 34 searches the file 20-D3 for the character "/" to determine if any additional metadata nodes 22 have been defined in the file 20-D3. The object builder 34 detects the character "/" followed by the text "TEST1" and determines that a metadata node 22-D3 is defined in the file 20-D3. The object builder 34 then generates an in-memory node 46-D3 that corresponds to the metadata node 22-D3 defined in the file 20-D3, and provides a label, or name 48-D3 of "/TEST1" based on the metadata node name identified in the file 20-D3. The object builder 34 also determines that the metadata node 22-D3 includes an attribute-value pair 24-D3 and stores a copy of the attribute-value pair 24-D3 as an attribute-value pair 24-D3C in the in-memory node 46-D3.

The object builder 34 similarly determines that the file 20-D3 identifies a metadata node 22-D4 that has an attribute-value pair 24-D4 and generates the in-memory node 46-D4 in response. The object builder 34 similarly determines that the file 20-D3 identifies a metadata node 22-D5 that has an attribute-value pair 24-D5 and generates the in-memory node 46-D5 in response. The object builder 34 determines that the file 20-D3 identifies no additional metadata nodes 22.

The object builder 34 then searches the directory 18-D3 for any files 20 that have the predetermined extension ".FMF" and have a name other than "MAIN.FMF". In this example, there are no such files 20. The object builder 34 then accesses each of the directories 18-D4, 18-D5, and 18-D6, and determines that none of the directories 18-D4, 18-D5, and 18-D6 have a file 20 with the predetermined name "MAIN.FMF" or a file 20 having the predetermined extension ".FMF" and a name other than "MAIN.FMF". The object builder 34 also determines that the directory 18-D1 has no additional child directories 18, and thus determines that the hierarchical tree structure 44D is complete.

The object builder 34 may then generate objects 52-D1-52-D3 in response to a request, and send the objects 52-D1-52-D3 to the display device 30. Note that despite defining the plurality of metadata nodes 22-D1-22-D5 differently from that discussed above with regard to FIGS. 1 and 4, the metadata nodes 22-D1-22-D5 have the same hierarchy and same attribute-value pairs as the metadata nodes 22-A1-22-A5 (FIG. 1) and as the metadata nodes 22-C1-22-C5 (FIG. 4), and thus the hierarchical tree structure 44D is identical to the hierarchical tree structures 44A and 44C, and the objects 52-D1-52-D3 are identical to the objects 52-A1-52-A3 and 52-C1-52-C3, respectively.

Figure 6:
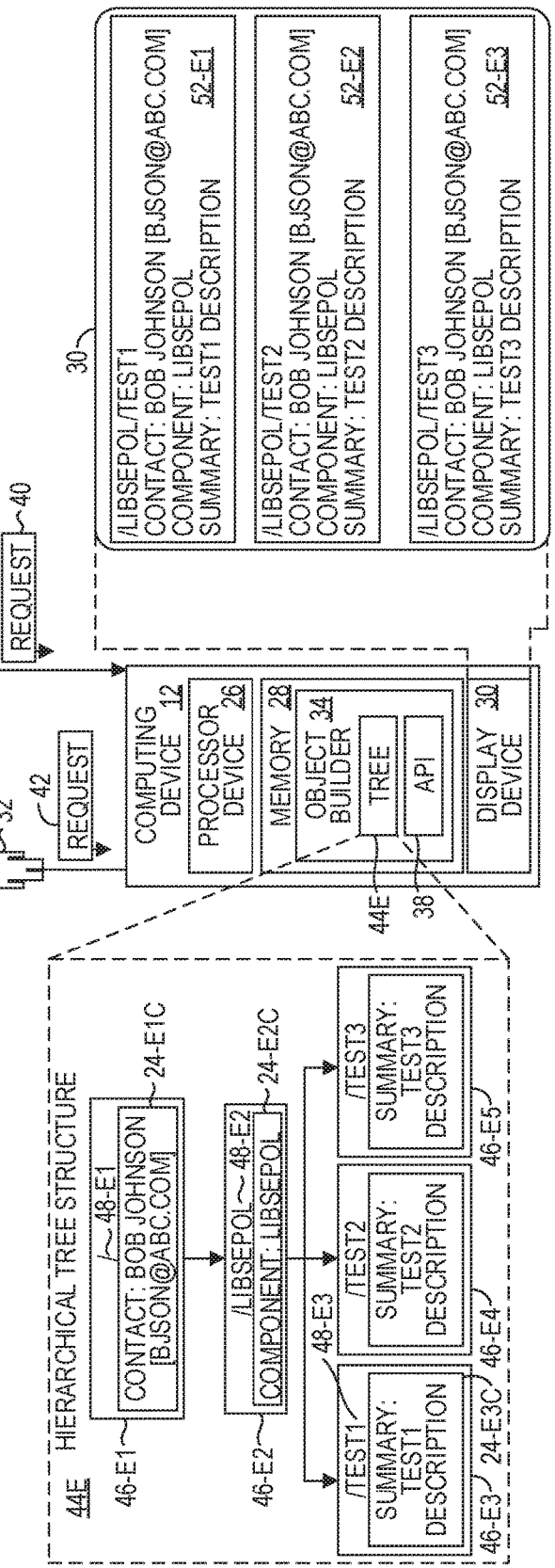
FIG. 6 is a block diagram of an environment in which object creation from hierarchical metadata stored on a storage device may be implemented according to additional examples.

FIG. 6 is a block diagram of an environment 10-4 in which object creation from hierarchical metadata stored on a storage device may be implemented according to additional examples. FIG. 6 is substantially similar to FIG. 1, except as otherwise discussed herein. In this example the storage device 14 includes a file system that implements a hierarchy 16E of a plurality of directories 18-E1-18-E6, and a plurality of files 20-E1-20-E3. The environment 10-4 illustrates all three mechanisms for defining metadata nodes discussed above.

To generate a hierarchical tree structure 44E, the object builder 34 accesses the storage device 14 and determines a metadata root directory 18 of the hierarchy 16E of directories 18. The object builder 34 then searches the root directory 18-E1 for a file with a predetermined name, in this example "MAIN.FMF". The object builder 34 locates the file 20-E2. The object builder 34 then generates an in-memory node 46-E1 that corresponds to the file 20-E2, and provides a label, or name 48-E1 of "/" to identify the in-memory node 46-E1 as the root in-memory node 46 of the hierarchical tree structure 44E. The object builder 34 obtains an attribute-value pair 24-E1 from the file 20-E2 and stores a copy of the attribute-value pair 24-E1 as an attribute-value pair 24-E1C in the in-memory node 46-E1. The object builder 34 then searches the directory 18-E1 for any files 20 that have the predetermined extension ".FMF" and have a name other than "MAIN.FMF".

In this example, the object builder 34 identifies the file 20-E3 as a file 20 that has a predetermined extension ".FMF" and has a name other than "MAIN.FMF", in this example "LIBSEPOL.FMF". The object builder 34 then generates the in-memory node 46-E2 that corresponds to the file 20-E3, and provides a label, or name 48-E2 of "/LIBSEPOL" based on the name of the file 20-E3. The object builder 34 obtains an attribute-value pair 24-E2 from the file 20-E3 and stores a copy of the attribute-value pair 24-E2 as an attribute-value pair 24-E2C in the in-memory node 46-E2.

The object builder 34 searches for the character "/" to determine if any additional metadata nodes 22 have been defined in the file 20-E3. The object builder 34 detects the character "/" followed by the text "TEST1" and determines that a metadata node 22-E3 is defined in the file 20-E3. The object builder 34 then generates an in-memory node 46-E3 that corresponds to the metadata node 22-E3 defined in the file 20-E3, and provides a label, or name 48-E3 of "/TEST1" based on the metadata node name identified in the file 20-E3. The object builder 34 also determines that the metadata node 22-E3 includes an attribute-value pair 24-E3 and stores a copy of the attribute-value pair 24-E3 as an attribute-value pair 24-E3C in the in-memory node 46-E3.

The object builder 34 similarly determines that the file 20-E3 identifies a metadata node 22-E4 that has an attribute-value pair 24-E4 and generates the in-memory node 46-E4 in response. The object builder 34 similarly determines that the file 20-E3 identifies a metadata node 22-E5 that has an attribute-value pair 24-E5 and generates the in-memory node 46-E5 in response. The object builder 34 determines that the file 20-E3 identifies no additional metadata nodes 22.

The object builder 34 then searches the directory 18-E3 for any additional files 20 that have the predetermined extension ".FMF" and have a name other than "MAIN.FMF". In this example, there are no such files 20. The object builder 34 then accesses each of the directories 18-E4, 18-E5, and 18-E6, and determines that none of the directories 18-E4, 18-E5, and 18-E6 have a file 20 with the predetermined name "MAIN.FMF" or a file 20 having the predetermined extension ".FMF" and a name other than "MAIN.FMF". The object builder 34 also determines that the directory 18-E1 has no additional child directories 18, and thus determines that the hierarchical tree structure 44E is complete.

The object builder 34 may then generate objects 52-E1-52-E3 in response to a request, and send the objects 52-E1-52-E3 to the display device 30. Note that despite defining the plurality of metadata nodes 22-E1-22-E5 differently from that discussed above with regard to FIGS. 1, 4, and 5 the metadata nodes 22-E1-22-E5 have the same hierarchy and same attribute-value pairs as the metadata nodes 22-A1-22-A5 illustrated in FIG. 1, and thus the hierarchical tree structure 44E is identical to the hierarchical tree structure 44A, and the objects 52-E1-52-E3 are identical to the objects 52-A1-52-A3, respectively.

Figure 7:
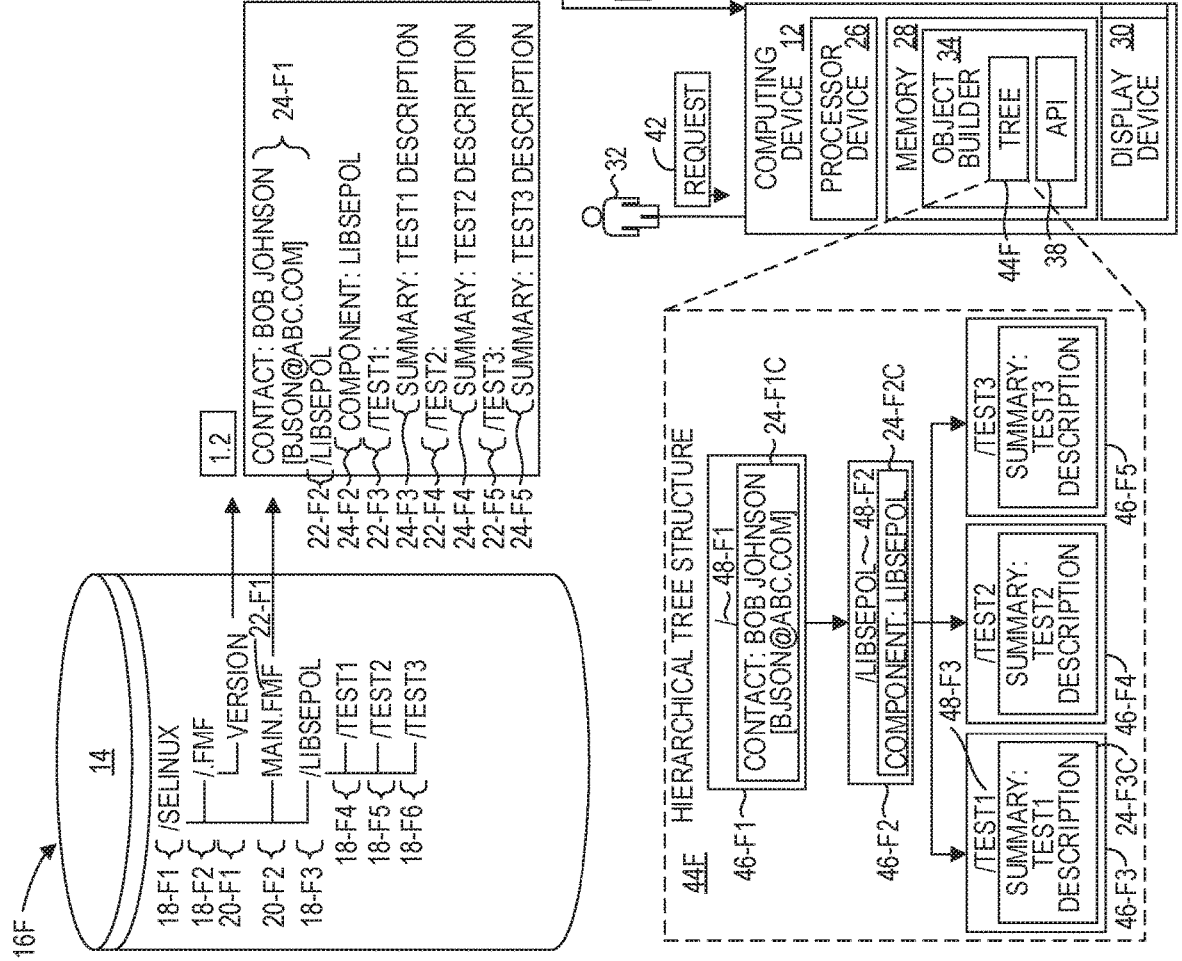
FIG. 7 is a block diagram of an environment in which object creation from hierarchical metadata stored on a storage device may be implemented according to additional examples.

FIG. 7 is a block diagram of an environment 10-5 in which object creation from hierarchical metadata stored on a storage device may be implemented according to additional examples. FIG. 7 is substantially similar to FIG. 1, except as otherwise discussed herein. In this example the storage device 14 includes a file system that implements a hierarchy 16F of a plurality of directories 18-F1-18-F6, and a plurality of files 20-F1-20-F2.

To generate a hierarchical tree structure 44F, the object builder 34 accesses the storage device 14 and determines a metadata root directory 18 of the hierarchy 16F of directories 18. The object builder 34 then searches the root directory 18-F1 for a file 20 with a predetermined name, in this example "MAIN.FMF". The object builder 34 locates the file 20-F2. The object builder 34 then generates an in-memory node 46-F1 that corresponds to the file 20-F2, and provides a label, or name 48-F1 of "/" to identify the in-memory node 46-F1 as the root in-memory node 46 of the hierarchical tree structure 44F. The object builder 34 obtains an attribute-value pair 24-F1 from the file 20-F2 and stores a copy of the attribute-value pair 24-F1 as an attribute-value pair 24-F1C in the in-memory node 46-F1.

The object builder 34 searches for the character "/" to determine if any additional metadata nodes 22 have been defined in the file 20-F2. The object builder 34 detects the character "/" followed by the text "LIBSEPOL" and determines that a metadata node 22-F2 is defined in the file 20-F2. The object builder 34 then generates an in-memory node 46-F2 that corresponds to the metadata node 22-F2 defined in the file 20-F2, and provides a label, or name 48-F2 of "/LIBSEPOL" based on the metadata node name identified in the file 20-F2. The object builder 34 also determines that the metadata node 22-F2 includes an attribute-value pair 24-F2 and stores a copy of the attribute-value pair 24-F2 as an attribute-value pair 24-F2C in the in-memory node 46-F2.

The object builder 34 similarly detects the character "/" followed by the text "TEST1" and determines that a metadata node 22-F3 is defined in the file 20-F2. The object builder 34 determines that the text "/TEST1" is at a deeper level of indentation than the text "/LIBSEPOL" that defines the metadata node 22-F2, and thereby determines that the metadata node 22-F3 is a child metadata node to the metadata node 22-F2. The object builder 34 then generates an in-memory node 46-F3 that corresponds to the metadata node 22-F3 defined in the file 20-F2, and provides a label, or name 48-F3 of "/TEST1" based on the metadata node name identified in the file 20-F2. The object builder 34 also determines that the metadata node 22-F3 includes an attribute-value pair 24-F3 and stores a copy of the attribute-value pair 24-F3 as an attribute-value pair 24-F3C in the in-memory node 46-F3.

The object builder 34 similarly determines that the file 20-F2 identifies a metadata node 22-F4 that has an attribute-value pair 24-F4 and generates the in-memory node 46-F4 in response. Again, because the indentation of the name "/TEST2" is the deeper than the indentation of the name "/LIBSEPOL" and is at the same level of indentation as the name "/TEST1", the object builder 34 determines that the metadata node 22-F4 is a child metadata node to the metadata node 22-F2. The object builder 34 similarly determines that the file 20-F2 identifies a metadata node 22-F5 that has an attribute-value pair 24-F5 and generates the in-memory node 46-F5 in response. The object builder 34 determines that the file 20-F2 identifies no additional metadata nodes 22.

The object builder 34 then determines that the directory 18-F3 has no file 20 with the predetermined name "MAIN.FMF" or a file 20 having the predetermined extension ".FMF" and a name other than "MAIN.FMF". Similarly, the object builder 34 determines that none of the directories 18-F4, 18-F5, and 18-F6 have a file 20 with the predetermined name "MAIN.FMF" or a file 20 having the predetermined extension ".FMF" and a name other than "MAIN.FMF". The object builder 34 also determines that the directory 18-F1 has no additional child directories 18, and thus determines that the hierarchical tree structure 44F is complete.

The object builder 34 may then generate objects 52-F1-52-F3 in response to a request, and send the objects 52-F1-52-F3 to the display device 30. Note that despite defining the plurality of metadata nodes 22-F1-22-F5 differently from that discussed above with regard to FIGS. 1, 4, 5 and 6, the metadata nodes 22-F1-22-F5 have the same hierarchy and same attribute-value pairs as the metadata nodes 22-A1-22-A5 illustrated in FIG. 1, and thus the hierarchical tree structure 44F is identical to the hierarchical tree structure 44A illustrated in FIG. 1, and the objects 52-F1-52-F3 are identical to the objects 52-A1-52-A3, respectively.

Figure 8:
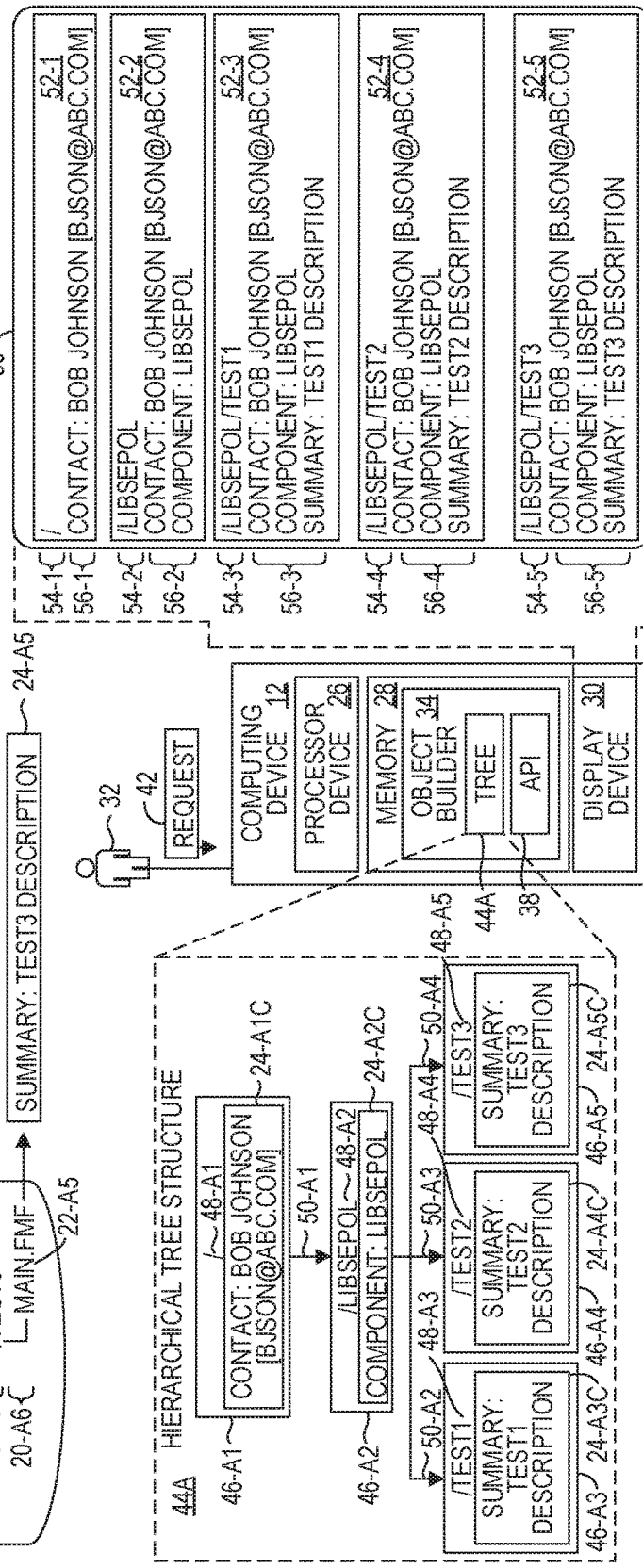
FIG. 8 is a block diagram of the environment illustrated in FIG. 1 after a request to generate objects that correspond to each metadata node in a hierarchy of metadata nodes, according to one example.

FIG. 8 is a block diagram of the environment illustrated in FIG. 1 after a request to generate objects that correspond to each metadata node 22 in a hierarchy of metadata nodes 22, according to one example. In this example, the object builder 34 receives a request from the operator 32 that requests that objects that correspond to each metadata node 22 be generated and sent to the display device 30. Assuming that the hierarchical tree structure 44A has previously been generated, the object builder 34 accesses the root in-memory node 46-A1, and based only on the root in-memory node 46-A1 generates and sends an object 52-1 to the display device 30. The object 52-1 includes a name 54-1 that is based on the name 48-A1 of the in-memory node 46-A1 and includes an attribute-value pair 56-1 that is identified in the in-memory node 46-A1.

The object builder 34 then traverses the link 50-A1 and accesses the in-memory node 46-A2. The object builder 34 then generates an object 52-2 that has a name 54-2 that is based on the name 48-A1 of the in-memory node 46-A1 and the name 48-A2 of the in-memory node 46-A2. The object 52-2 includes an attribute-value pair 56-2 that includes the attribute-value pair 24-A1C of the in-memory node 46-A1, and the attribute-value pair 24-A2C of the in-memory node 46-A2.

The object builder 34 traverses the links 50-A1 and 50-A2 that establish the path of in-memory nodes 46-A1, 46-A2 and 46-A3 from the root in-memory node 46-A1 to the leaf in-memory node 46-A3, and generates the object 52-3. The object 52-3 has a name 54-3 that is based on the names 48-A1, 48-A2 and 48-A3 of the in-memory nodes 46-A1, 46-A2 and 46-A3. The object 52-3 has attribute-value pairs 56-3 that were identified in the in-memory nodes 46-A1, 46-A2 and 46-A3.

The object builder 34 also traverses the links 50-A1 and 50-A3 that connect the path of in-memory nodes 46-A1, 46-A2 and 46-A4 from the root in-memory node 46-A1 to the leaf in-memory node 46-A4, and generates the object 52-4. The object 52-4 has a name 54-4 that is based on the names 48-A1, 48-A2 and 48-A4 of the names of the in-memory nodes 46-A1, 46-A2 and 46-A4. The object 52-4 has attribute-value pairs 56-4 that were identified in the in-memory nodes 46-A1, 46-A2 and 46-A4. The object builder 34 also traverses the links 50-A1 and 50-A4 that connect the path of in-memory nodes 46-A1, 46-A2 and 46-A5 from the root in-memory node 46-A1 to the leaf in-memory node 46-A5, and generates the object 52-5. The object 52-5 has a name 54-5 that is based on the names 48-A1, 48-A2 and 48-A5 of the in-memory nodes 46-A1, 46-A2 and 46-A5. The object 52-5 has attribute-value pairs 56-5 that were identified in the in-memory nodes 46-A1, 46-A2 and 46-A5.

Figure 9:
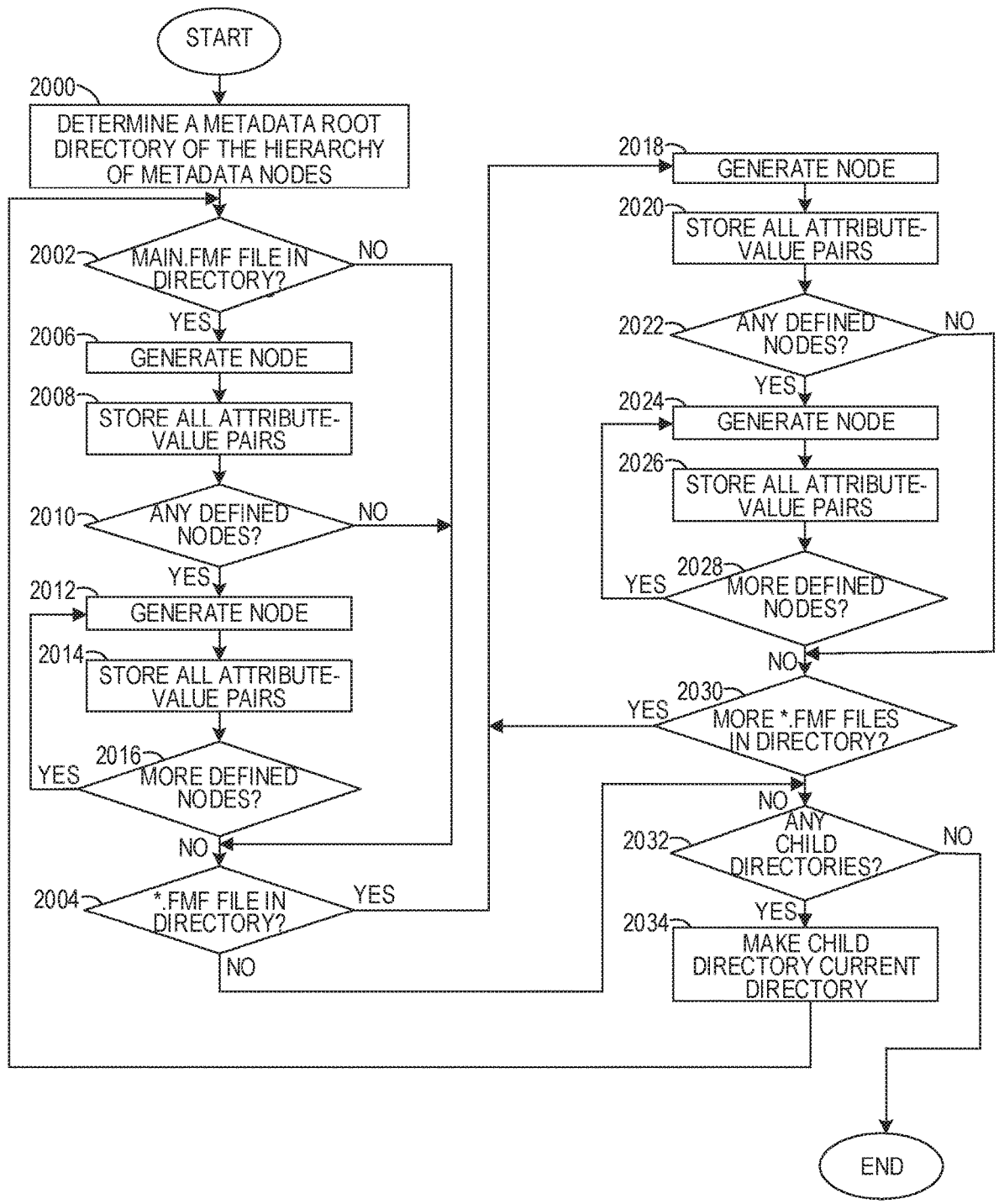
FIG. 9 is a flowchart of a method for generating objects from hierarchical metadata stored on a storage device according to another example.

FIG. 9 is a flowchart of a method for generating objects from hierarchical metadata stored on a storage device according to another example. FIG. 9 will be discussed in conjunction with FIG. 1. The object builder 34 determines a root metadata directory 18-A1 of the hierarchy of metadata nodes 22 (block 2000). The root metadata directory 18-A1 could be designated in any desired manner, such as via configuration information, or, as discussed with regard to FIG. 1, by the existence of the directory 18-A2 having the predetermined name ".FMF".

The object builder 34 determines whether the directory 18-A1 contains a file 20 with the predetermined name "MAIN.FMF". If not, the object builder 34 determines whether the directory 18-A1 contains a file 20 having the predetermined extension ".FMF" and a different name than "MAIN.FMF" (block 2004). If, at block 2002, the directory 18-A1 contains a file 20 with the predetermined name "MAIN.FMF", the object builder 34 generates an in-memory node 46, such as the in-memory node 46-A1, that corresponds to the file 20 with the predetermined name "MAIN.FMF" (block 2006). The object builder 34 also stores all attribute-value pairs 24 identified in the "MAIN.FMF" file in the in-memory node 46-A1 (block 2008). The object builder 34 then determines if the file 20 contains any defined metadata nodes 22, such as via the use of the "/" character, as discussed above with regard to FIG. 5 (block 2010). If so, the object builder 34 generates an in-memory node 46, and stores all the attribute-value pairs identified for the defined metadata node 22 in the in-memory node 46 (blocks 2012-2014). The object builder 34 repeats this process for each defined metadata node 22 in the file 20 (block 2016). If at block 2010 there were no defined metadata nodes 22 in the file 20, the object builder 34 determines whether a file 20 having the predetermined extension ".FMF" and a different name than "MAIN.FMF" exists in the directory 18-A1 (block 2004). If so, the object builder 34 generates an in-memory node 46 that corresponds to the file 20 having the predetermined extension ".FMF" and a different name than "MAIN.FMF" (block 2018). The object builder 34 also stores all attribute-value pairs identified in the file 20 in the in-memory node 46 (block 2020). The object builder 34 then determines if the file 20 contains any defined metadata nodes 22, such as via the use of the "/" character (block 2022). If so, the object builder 34 generates an in-memory node 46, and stores all the attribute-value pairs identified for the defined metadata node 22 in the in-memory node 46 (blocks 2024-2026). The object builder repeats this process for each defined metadata node 22 in the file 20 (block 2028). The object builder 34 repeats this process for each file 20 having the predetermined extension ".FMF" and a different name than "MAIN.FMF" in the directory 18 (block 2030).

The object builder 34 then determines if the directory 18 has any child directories 18 (block 2032). If so, the object builder 34 repeats the entire process with each child directory 18 (block 2034). The entire process is repeated for each child directory 18 in any path from the root metadata directory 18 to a leaf metadata node 22.

Figure 10:
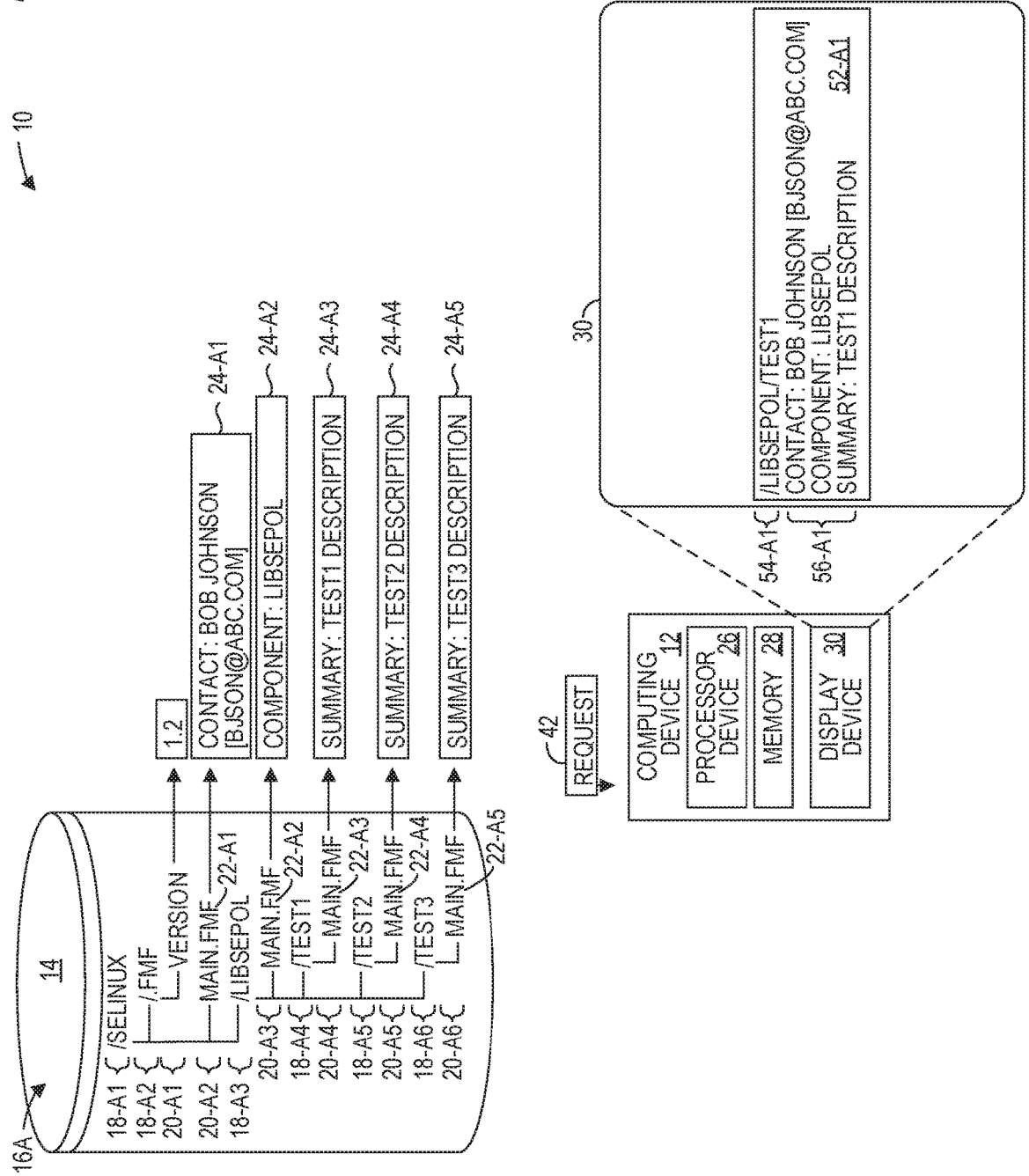
FIG. 10 is a simplified block diagram of the environment illustrated in FIG. 1 according to one example.

FIG. 10 is a simplified block diagram of the environment 10 illustrated in FIG. 1 according to one example. The computing device 12 includes the memory 28 and the processor device 26 coupled to the memory 28. The processor device 26 is to receive the request 42 to generate an object 52-A1 from the hierarchy of the plurality of metadata nodes 22 identified in the files 20 stored in the one or more directories 18 in the file system of the storage device 14. At least some of the metadata nodes 22 include one or more attribute-value pairs 24. Based on the hierarchy of the plurality of metadata nodes 22 identified in the files 20, the processor device 26 is to generate the object 52-A1, the object 52-A1 including each attribute-value pair 24 from each metadata node 22 in a path of metadata nodes 22-A1, 22-A2, 22-A3 from a root metadata node 22-A1 to an object metadata node 22-A3 that corresponds to the object 52-A1. The processor device 26 is to send the object 52-A1 to a destination.

Figure 11:
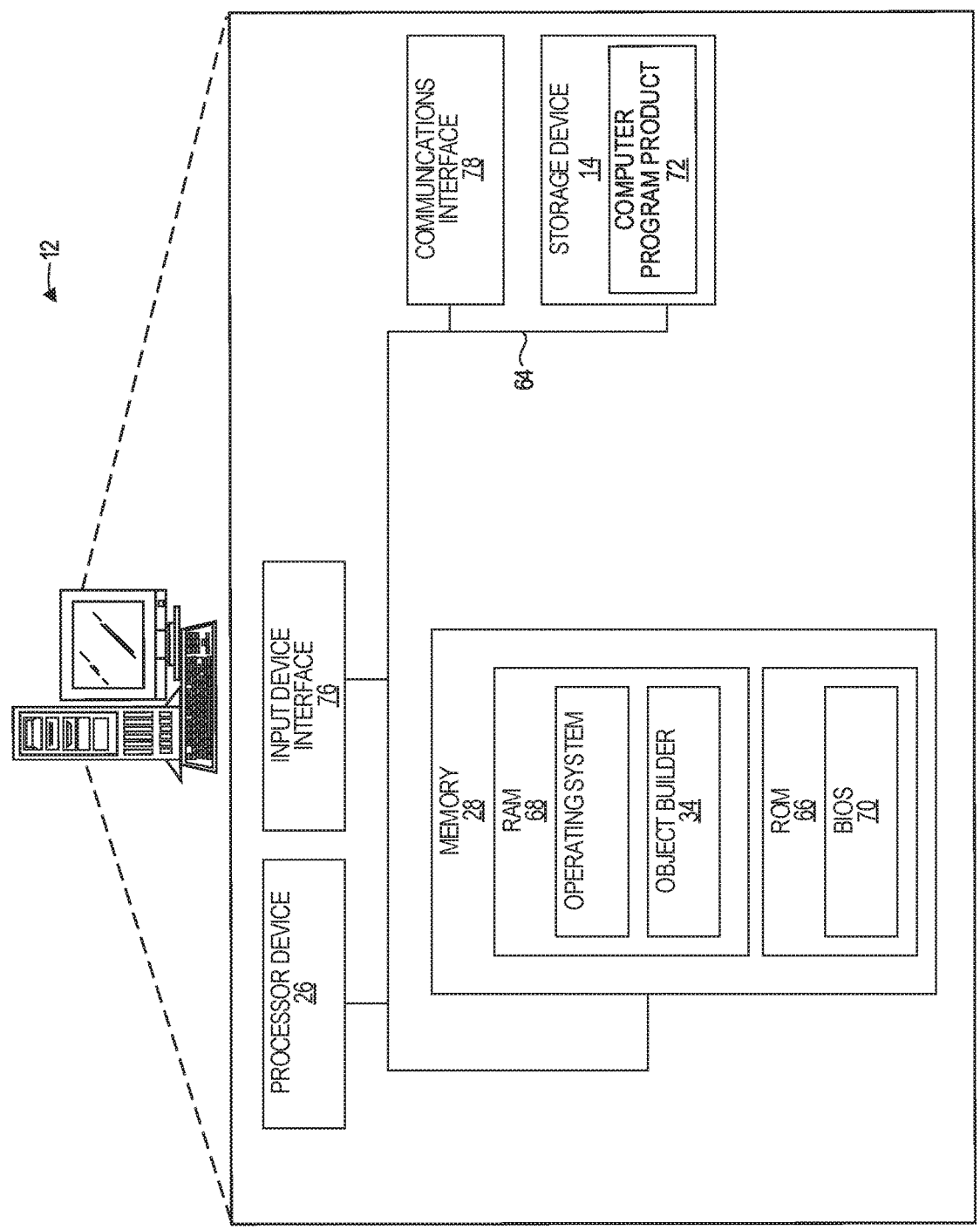
FIG. 11 is a block diagram of a computing device, for implementing the examples herein, according to one example.

FIG. 11 is a block diagram of the computing device 12 according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 26, the memory 28, and a system bus 64. The system bus 64 provides an interface for system components including, but not limited to, the memory 28 and the processor device 26. The processor device 26 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 28 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 12. The volatile memory 68 may also include a high-speed RAM, such as static RAM, for caching data.

The computing device 12 may further include or be coupled to a non-transitory computer-readable storage medium such as the storage device 14, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 14 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

The object builder 34 is a component of the computing device 12, and thus, functionality implemented by the object builder 34 may be attributed to the computing device 12 generally. Moreover, in examples where the object builder 34 comprises software instructions that program the processor device 26 to carry out functionality discussed herein, functionality implemented by the object builder 34 may be attributed herein to the processor device 26.

A number of modules can be stored in the storage device 14 and in the volatile memory 68, including an operating system and one or more program modules, such as the object builder 34, which may implement the functionality described herein in whole or in part.

All or a portion of the examples may be implemented as a computer program product 72 stored on a transitory or non-transitory computer-usable or computer-readable storage medium, such as the storage device 14, which includes complex programming instructions, such as complex computer-readable program code, to cause the processor device 26 to carry out the steps described herein. Thus, the computer-readable program code can comprise software instructions for implementing the functionality of the examples described herein when executed on the processor device 26. The processor device 26, in conjunction with the object builder 34 in the volatile memory 68, may serve as a controller, or control system, for the computing device 12 that is to implement the functionality described herein.

The operator 32 may also be able to enter one or more configuration commands through a keyboard (not illustrated), a pointing device such as a mouse (not illustrated), or a touch-sensitive surface such as the display device 30. Such input devices may be connected to the processor device 26 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 78, such as an Ethernet transceiver or the like, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

receiving, by a computing device comprising a processor device, a request to generate an object from a hierarchy of a plurality of metadata nodes identified in files stored in one or more directories in a file system of a storage device, at least some of the metadata nodes comprising one or more attribute-value pairs;

based on the hierarchy of the plurality of metadata nodes identified in the files, generating the object, by:

generating a hierarchical tree structure comprising a plurality of in-memory nodes, each in-memory node corresponding to a metadata node identified in a file on the file system, the metadata nodes comprising a path of metadata nodes from a root metadata node to an object metadata node that corresponds to the object;

storing, in each in-memory node, the attribute-value pairs identified in the corresponding metadata node;

generating the object by accessing each in-memory node in a path of in-memory nodes from a root in-memory node to an object in-memory node that corresponds to the object; and storing, in the object, attribute-value information based on each attribute-value pair stored in each in-memory node in the path of in-memory nodes from the root in-memory node to the object in-memory node as each in-memory node in the path of in-memory nodes from the root in-memory node to the object in-memory node is accessed, such that the object includes the attribute-value information based on each attribute-value pair from each in-memory node in the path of in-memory nodes; and sending the object to a destination.

2. The method of claim 1 wherein storing, in the object, the attribute-value information based on each attribute-value pair stored in each in-memory node in the path of in-memory nodes from the root in-memory node to the object in-memory node comprises replacing any attribute-value pair in the object with each subsequent attribute-value pair that has an identical attribute as the attribute-value pair in the object.

3. The method of claim 1 wherein storing, in the object, the attribute-value information based on each attribute-value pair stored in each in-memory node in the path of in-memory nodes from the root in-memory node to the object in-memory node comprises:

for each in-memory node that has an attribute-value pair that includes an addition operator:
accessing an attribute-value pair in the object that has an identical attribute;
adding the value of the attribute-value pair of the in-memory node to the value of the attribute-value pair in the object to create a summed value; and
replacing the value of the attribute-value pair in the object with the summed value.

4. The method of claim 3 wherein the value of the attribute-value pair in the object is numeric, and wherein the summed value is the summation of the value of the attribute-value pair of the in-memory node and the value of the attribute-value pair in the object.

5. The method of claim 3 wherein the value of the attribute-value pair in the object comprises one or more characters, and wherein the summed value is the concatenation of the value of the attribute-value pair of the in-memory node with the value of the attribute-value pair in the object.

6. The method of claim 1 wherein receiving the request to generate the object from the hierarchy of the plurality of metadata nodes identified in the files stored in the one or more directories in the file system of the storage device comprises:

receiving a request to generate a plurality of objects, each object corresponding to a different leaf metadata node of the plurality of metadata nodes.

7. The method of claim 1 wherein receiving the request to generate the object from the hierarchy of the plurality of metadata nodes identified in the files stored in the one or more directories in the file system of the storage device comprises:

receiving a request to generate an object for each different metadata node.

8. A computing device, comprising:
a memory; and
a processor device coupled to the memory to:
receive a request to generate an object from a hierarchy of a plurality of metadata nodes identified in files stored in one or more directories in a file system of a storage device, at least some of the metadata nodes comprising one or more attribute-value pairs;
based on the hierarchy of the plurality of metadata nodes identified in the files, generate the object, by:
generating a hierarchical tree structure comprising a plurality of in-memory nodes, each in-memory node corresponding to a metadata node identified in a file on the file system, the metadata nodes comprising a path of metadata nodes from a root metadata node to an object metadata node that corresponds to the object;
storing, in each in-memory node, the attribute-value pairs identified in the corresponding metadata node;
generating the object by accessing each in-memory node in a path of in-memory nodes from a root in-memory node to an object in-memory node that corresponds to the object; and
storing, in the object, attribute-value information based on each attribute-value pair stored in each in-memory node in the path of in-memory nodes from the root in-memory node to the object in-memory node as each in-memory node in the path of in-memory nodes from the root in-memory node to the object in-memory node is accessed, such that the object includes the attribute-value information based on each attribute-value pair from each in-memory node in the path of in-memory nodes; and
send the object to a destination.

9. The computing device of claim 8 wherein to store, in the object, the attribute-value information based on each attribute-value pair stored in each in-memory node in the path of in-memory nodes from the root in-memory node to the object in-memory node, the processor device is further to replace any attribute-value pair in the object with each subsequent attribute-value pair that has an identical attribute as the attribute-value pair in the object.

10. The computing device of claim 8 wherein to store, in the object, attribute-value information based on each attribute-value pair stored in each in-memory node in the path of in-memory nodes from the root in-memory node to the object in-memory node, the processor device is further to:

for each in-memory node that has an attribute-value pair that includes an addition operator:
access an attribute-value pair in the object that has an identical attribute;
add the value of the attribute-value pair of the in-memory node to the value of the attribute-value pair in the object to create a summed value; and
replace the value of the attribute-value pair in the object with the summed value.

11. The computing device of claim 8 wherein to receive the request to generate the object from the hierarchy of the plurality of metadata nodes identified in the files stored in the one or more directories in the file system of the storage device, the processor device is further to:

receive a request to generate a plurality of objects, each object corresponding to a different leaf metadata node of the plurality of metadata nodes.

12. A computer program product stored on a non-transitory computer-readable storage medium and including instructions to cause a processor device to:

receive a request to generate an object from a hierarchy of a plurality of metadata nodes identified in files stored in one or more directories in a file system of a storage device, at least some of the metadata nodes comprising one or more attribute-value pairs;
based on the hierarchy of the plurality of metadata nodes identified in the files, generate the object, by:
generating a hierarchical tree structure comprising a plurality of in-memory nodes, each in-memory node corresponding to a metadata node identified in a file on the file system, the metadata nodes comprising a path of metadata nodes from a root metadata node to an object metadata node that corresponds to the object;
storing, in each in-memory node, the attribute-value pairs identified in the corresponding metadata node;
generating the object by accessing each in-memory node in a path of in-memory nodes from a root in-memory node to an object in-memory node that corresponds to the object; and
storing, in the object, attribute-value information based on each attribute-value pair stored in each in-memory node in the path of in-memory nodes from the root in-memory node to the object in-memory node as each in-memory node in the path of in-memory nodes from the root in-memory node to the object in-memory node is accessed, such that the object includes the attribute-value information based on each attribute-value pair from each in-memory node in the path of in-memory nodes; and send the object to a destination.

13. The computer program product of claim 12 wherein to store, in the object, the attribute-value information based on each attribute-value pair stored in each in-memory node in the path of in-memory nodes from the root in-memory node to the object in-memory node, the instructions further cause the processor device to replace any attribute-value pair in the object with each subsequent attribute-value pair that has an identical attribute as the attribute-value pair in the object.

14. The computer program product of claim 12 wherein to store, in the object, attribute-value information based on each attribute-value pair stored in each in-memory node in the path of in-memory nodes from the root in-memory node to the object in-memory node, the instructions further cause the processor device to:

for each in-memory node that has an attribute-value pair that includes an addition operator:
- access an attribute-value pair in the object that has an identical attribute;
- add the value of the attribute-value pair of the in-memory node to the value of the attribute-value pair in the object to create a summed value; and
- replace the value of the attribute-value pair in the object with the summed value.

\* \* \* \* \*